(12) United States Patent
Tsai

(10) Patent No.: US 12,489,517 B2
(45) Date of Patent: Dec. 2, 2025

(54) PORT MAPPING BETWEEN INPUT PORTS AND OUTPUT PORTS OF RCFT DEVICES FOR DL TRANSMISSION

(71) Applicant: Mediatek Inc., Hsinchu (TW)

(72) Inventor: Lung-Sheng Tsai, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 179 days.

(21) Appl. No.: 18/205,640

(22) Filed: Jun. 5, 2023

(65) Prior Publication Data

US 2024/0007178 A1 Jan. 4, 2024

Related U.S. Application Data

(60) Provisional application No. 63/367,625, filed on Jul. 4, 2022.

(51) Int. Cl.
*H04B 7/15* (2006.01)
*H04B 7/155* (2006.01)
*H04L 5/00* (2006.01)

(52) U.S. Cl.
CPC ....... *H04B 7/15542* (2013.01); *H04L 5/0023* (2013.01)

(58) Field of Classification Search
CPC .. H04B 7/15542; H04B 7/0691; H04L 5/0023
See application file for complete search history.

(56) References Cited

U.S. PATENT DOCUMENTS

2018/0358688 A1* 12/2018 Yue ................. H04W 72/21
2021/0050886 A1* 2/2021 Lee ................. H04L 5/0094

* cited by examiner

*Primary Examiner* — Hashim S Bhatti
(74) *Attorney, Agent, or Firm* — Troutman Pepper Locke LLP; Tim Tingkang Xia, Esq.

(57) ABSTRACT

A first repeater obtains a second set of $M_T$ baseband signals, with each baseband signal in the second set corresponding to one of the $M_T$ transmission antennas, and $M_T$ being a positive integer. The first repeater divides the $M_T$ transmission antennas into groups, with each group containing a predetermined number of antennas not exceeding $N_R$, and $N_R$ being the number of reception antennas at a UE and a positive integer. The first repeater allocates a first subset of L second transmission time intervals associated with a second SCS to the groups of transmission antennas, with the L second transmission time intervals corresponding to a first transmission time interval associated with a first SCS. The first repeater transmits RF signals on a second carrier frequency and carrying a subset of the second set of $M_T$ baseband signals, in each interval of the first subset of the L second transmission time intervals.

20 Claims, 18 Drawing Sheets

PORT MAPPING BETWEEN INPUT PORTS AND OUTPUT PORTS OF RCFT DEVICES FOR DL TRANSMISSION

CROSS-REFERENCE TO RELATED APPLICATION(S)

This application claims the benefits of U.S. Provisional Application Ser. No. 63/367,625, entitled "PORT MAPPING BETWEEN INPUT PORTS AND OUTPUT PORTS OF RCFT DEVICES FOR DL TRANSMISSION" and filed on Jul. 4, 2022. The contents of the application above are expressly incorporated by reference herein in their entirety.

BACKGROUND

Field

The present disclosure relates generally to communication systems, and more particularly, to techniques of forming distributed MIMO receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a group of M wireless devices are provided. In an aspect of the disclosure, a method, a computer-readable medium, and a repeater system are provided. The repeater system includes a first repeater. The first repeater obtains a second set of $M_T$ baseband signals, with each baseband signal in the second set corresponding to one of the $M_T$ transmission antennas, and $M_T$ being a positive integer. The first repeater divides the $M_T$ transmission antennas into groups, with each group containing a predetermined number of antennas not exceeding $N_R$, and $N_R$ being the number of reception antennas at a user equipment (UE) and a positive integer. The first repeater allocates a first subset of L second transmission time intervals associated with a second subcarrier spacing (SCS) to the groups of transmission antennas, with the L second transmission time intervals corresponding to a first transmission time interval associated with a first SCS. The first repeater transmits radio frequency (RF) signals on a second carrier frequency and carrying a subset of the second set of $M_T$ baseband signals, in each interval of the first subset of the L second transmission time intervals using a group of transmission antennas to which that interval is allocated.

In another aspect of the disclosure, a method, a computer-readable medium, and an apparatus are provided. The apparatus is a UE. The UE receives radio frequency (RF) signals on a second carrier frequency during L second transmission time intervals. The RF signals are transmitted by one or more repeaters. Each repeater has $M_T$ transmission antennas and $M_R$ reception antennas. The UE extracts a set of baseband signals from the received RF signals. The set of baseband signals includes a subset of baseband signals transmitted by the one or more repeaters during each of the L second transmission time intervals. The UE combines the extracted baseband signals from different second transmission time intervals. The UE recovers original baseband signals transmitted by a base station on a first carrier frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
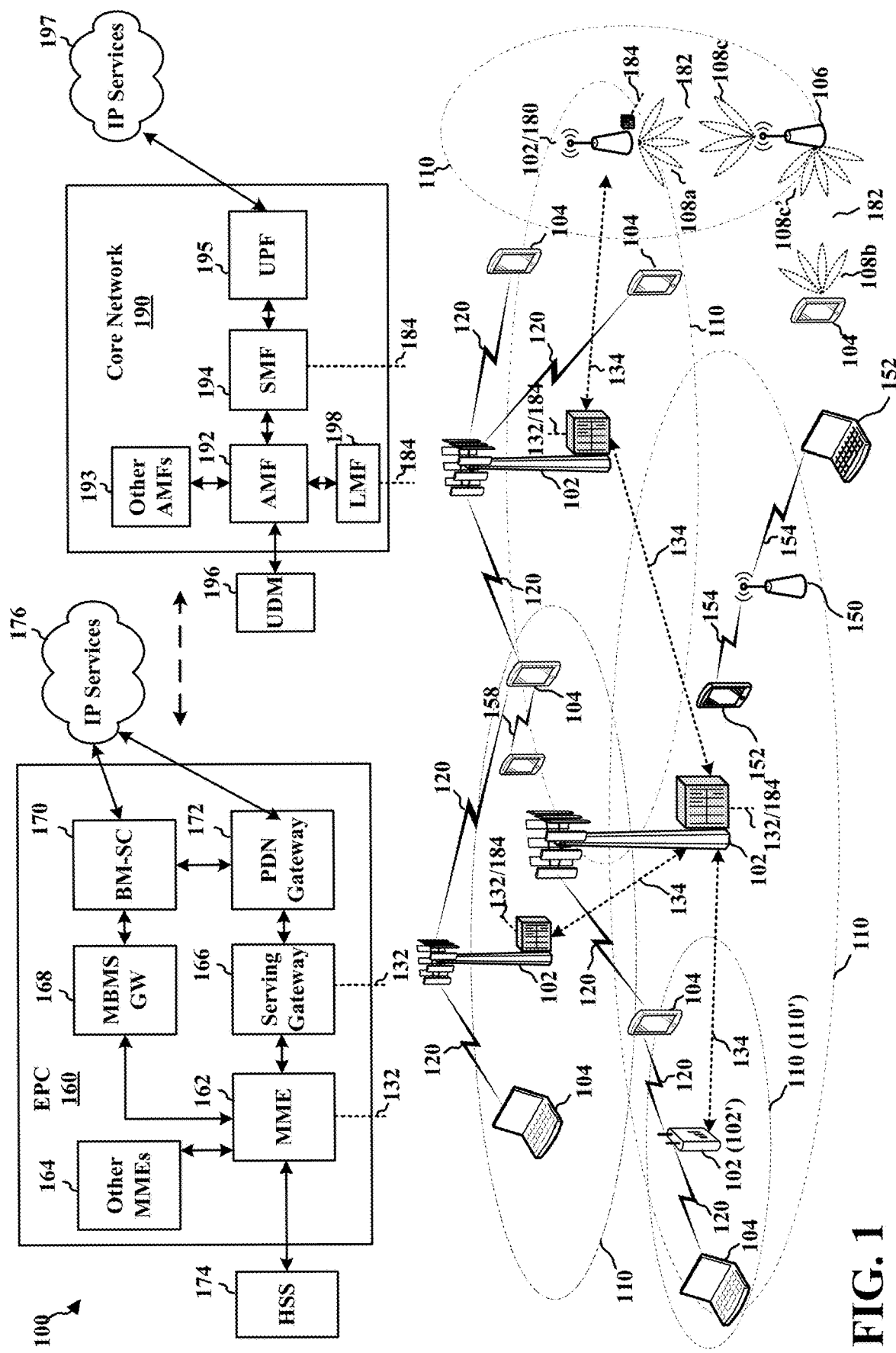
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz 300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
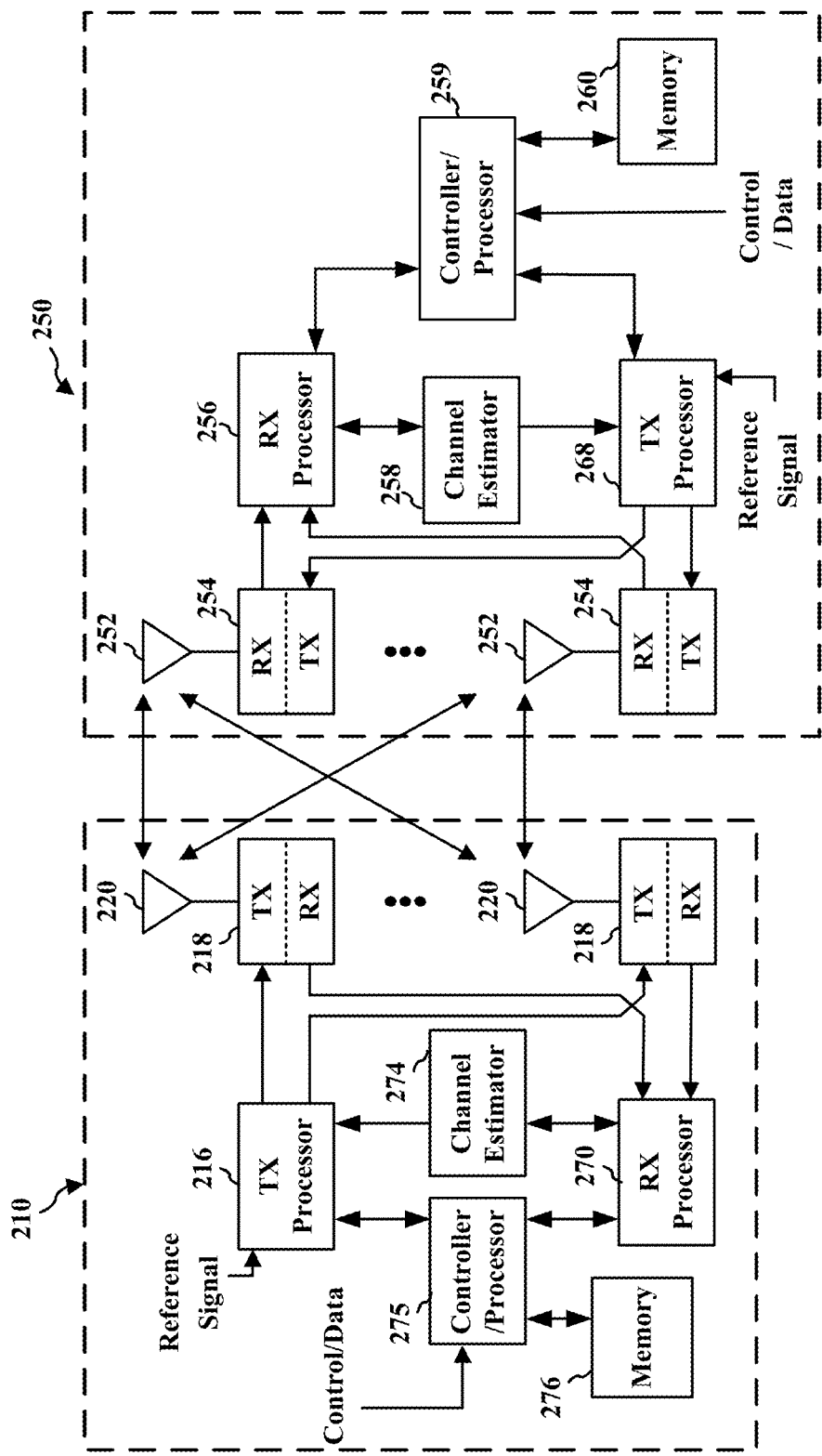
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers for each RB with a subcarrier spacing (SCS) of 60 kHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
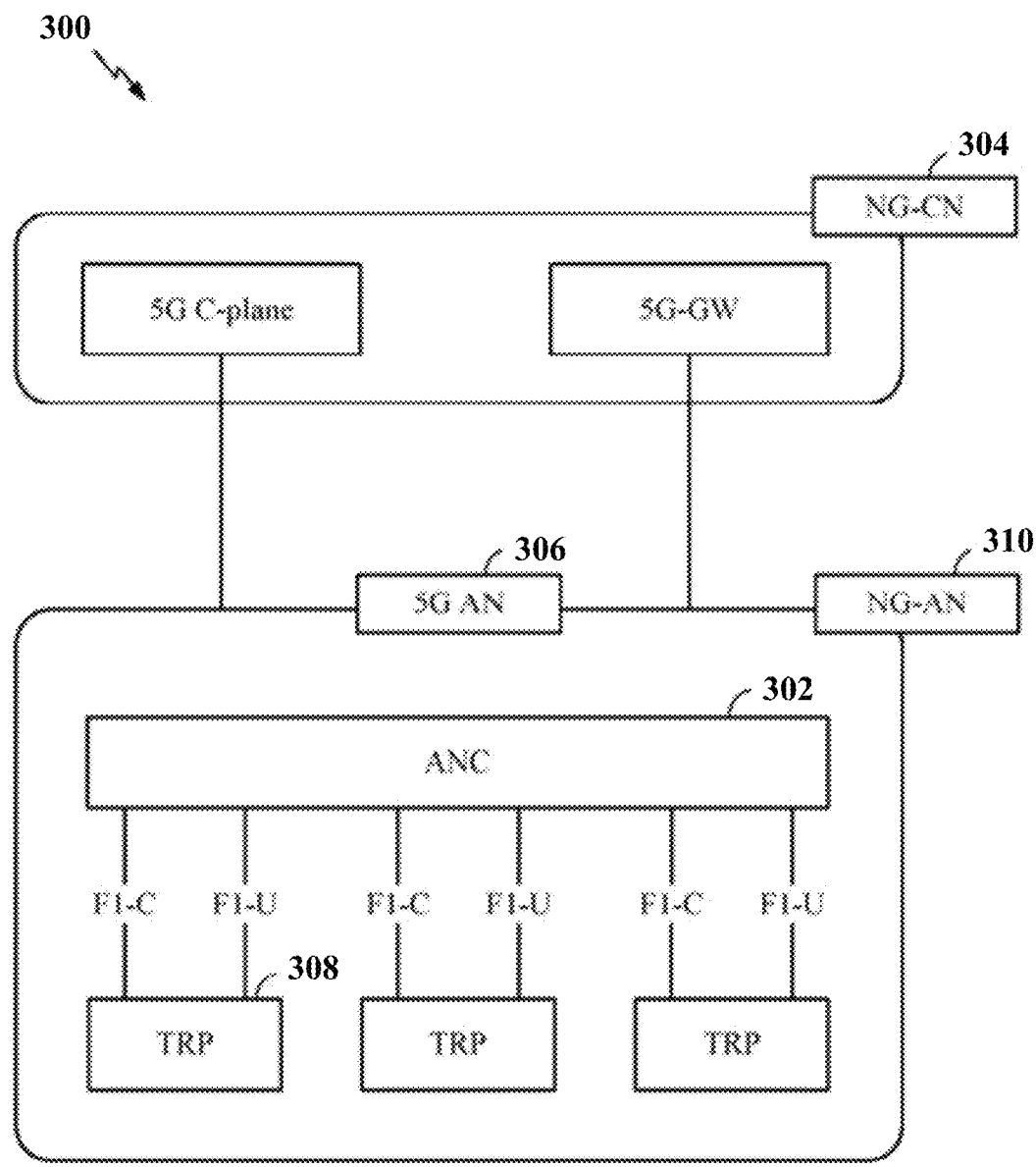
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "ccell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
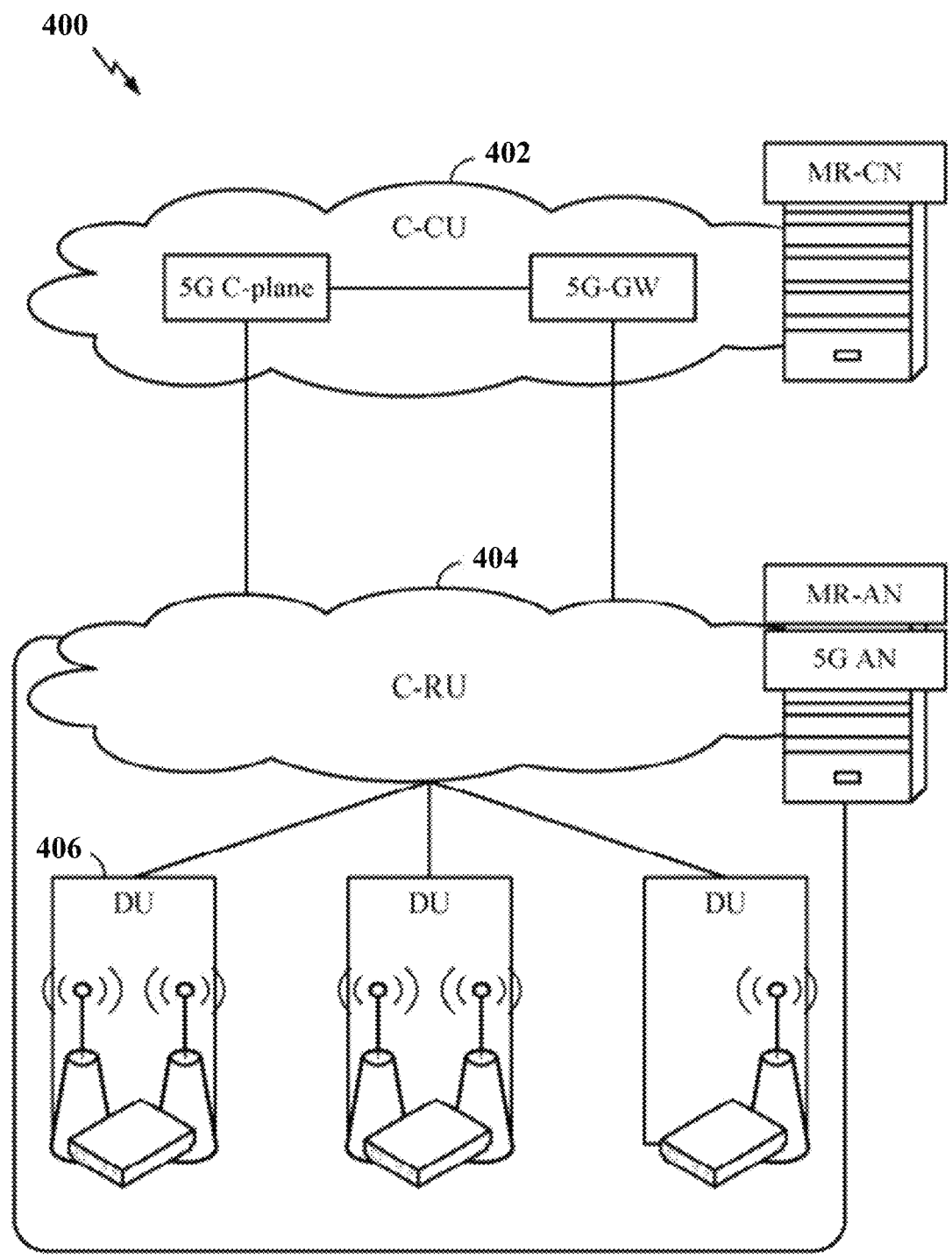
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
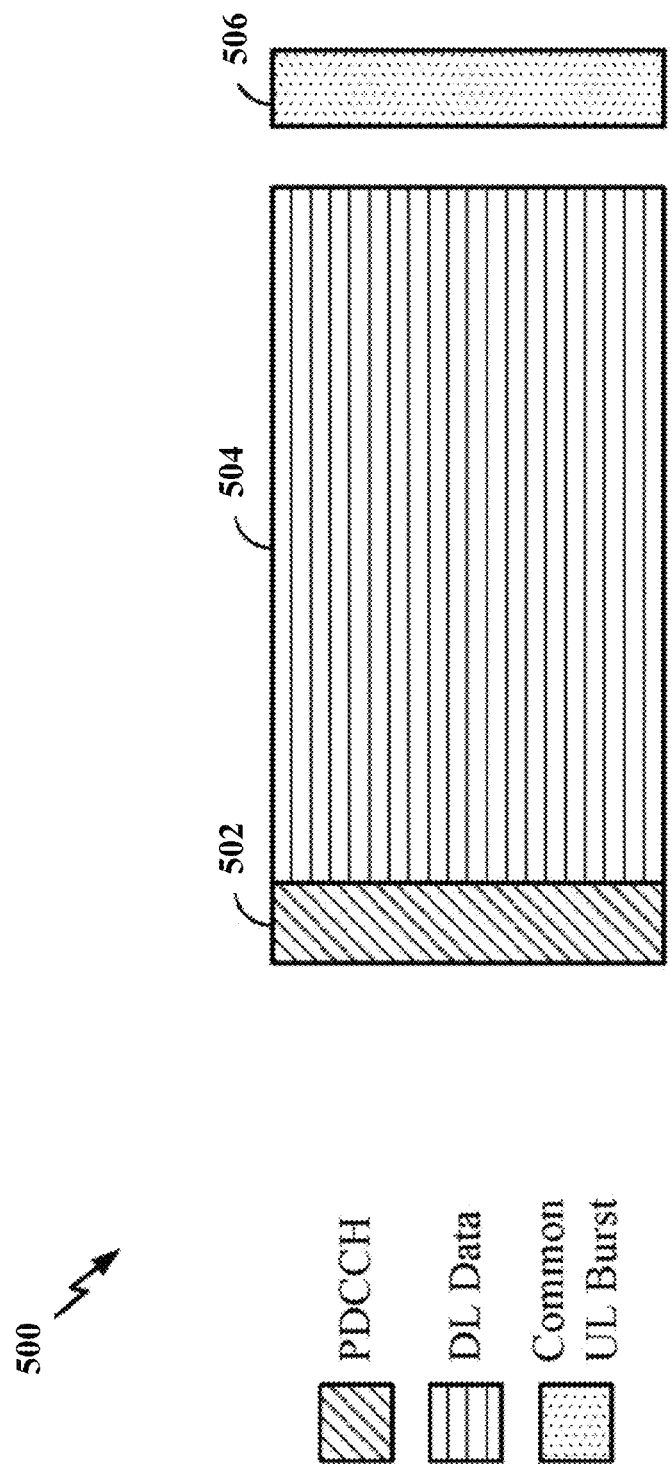
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
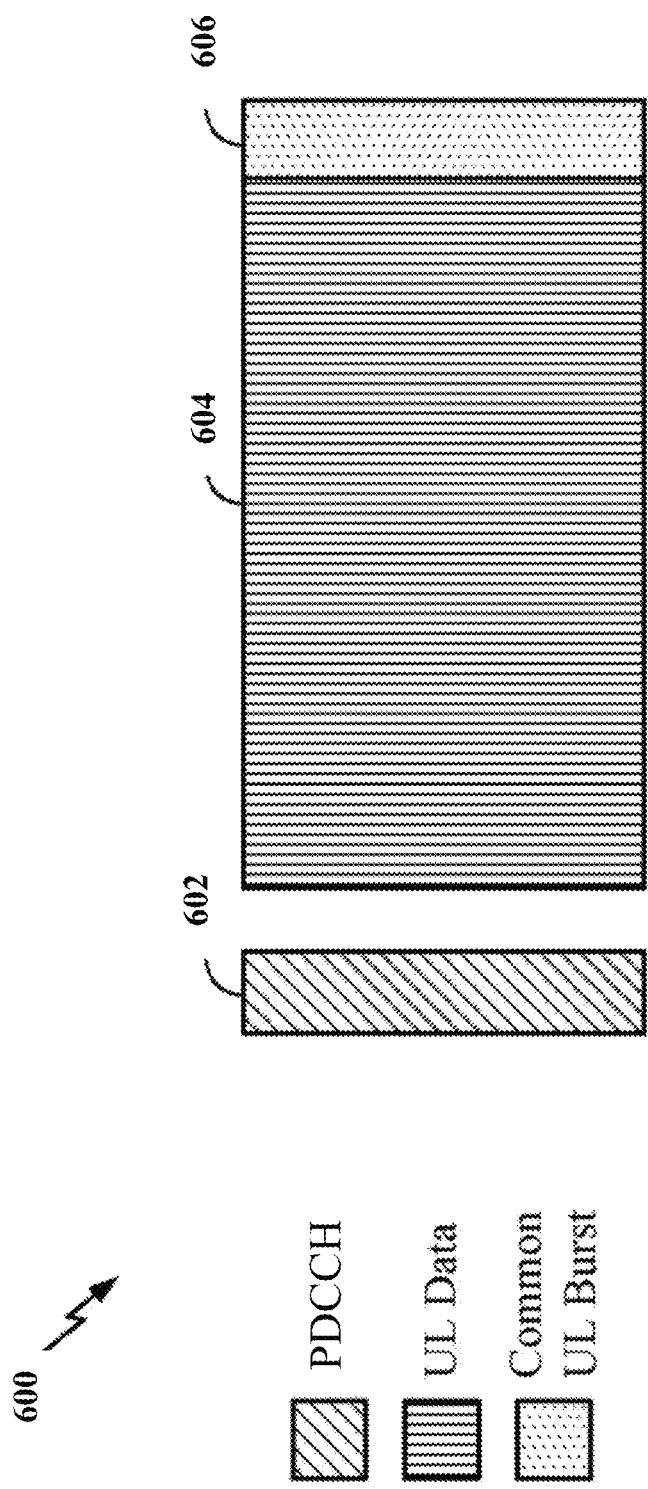
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
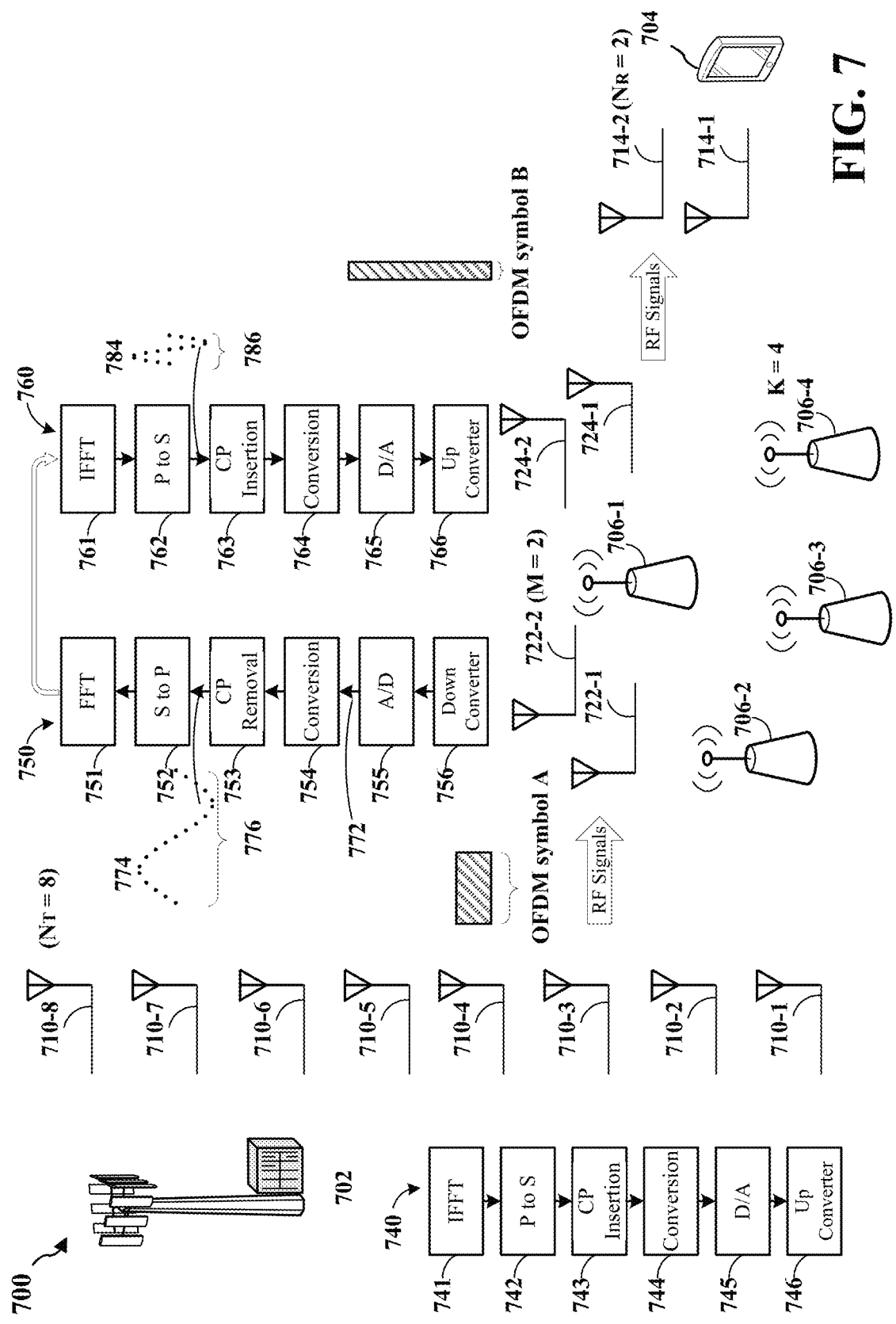
FIG. 7 is a diagram illustrating downlink MIMO transmission from a base station to a UE via one or more repeaters.

FIG. 7 is a diagram 700 illustrating downlink MIMO transmission from a base station to a UE via one or more repeaters. In this example, a base station 702 has 8 antennas 710-1, 710-2, . . . 710-8, and a UE 704 has 2 reception antennas 714-1, 714-2. Further, repeaters 706-1 . . . 706-K are placed between the base station 702 and the UE 704. In this example, K is 4. Each of the repeaters 706-1 . . . 706-K has two reception antennas 722-1, 722-2 and two transmission antennas 724-1, 724-2. In certain configurations, the same antenna may function as a reception antenna and a transmission antenna. Each repeater may be a rate converting and frequency translation (RCFT) device.

The base station 702 utilizes a respective transmission chain 740 to generate RF signals to be transmitted at each of the antennas 710-1, 710-2, . . . 710-8. Each transmission chain 740 includes an IFFT component 741, a parallel to serial component 742, a CP insertion component 743, a conversion component 744 that includes a rate converter and/or filter(s), a digital-to-analog converter 745, and an up converter 746.

Figure 8:
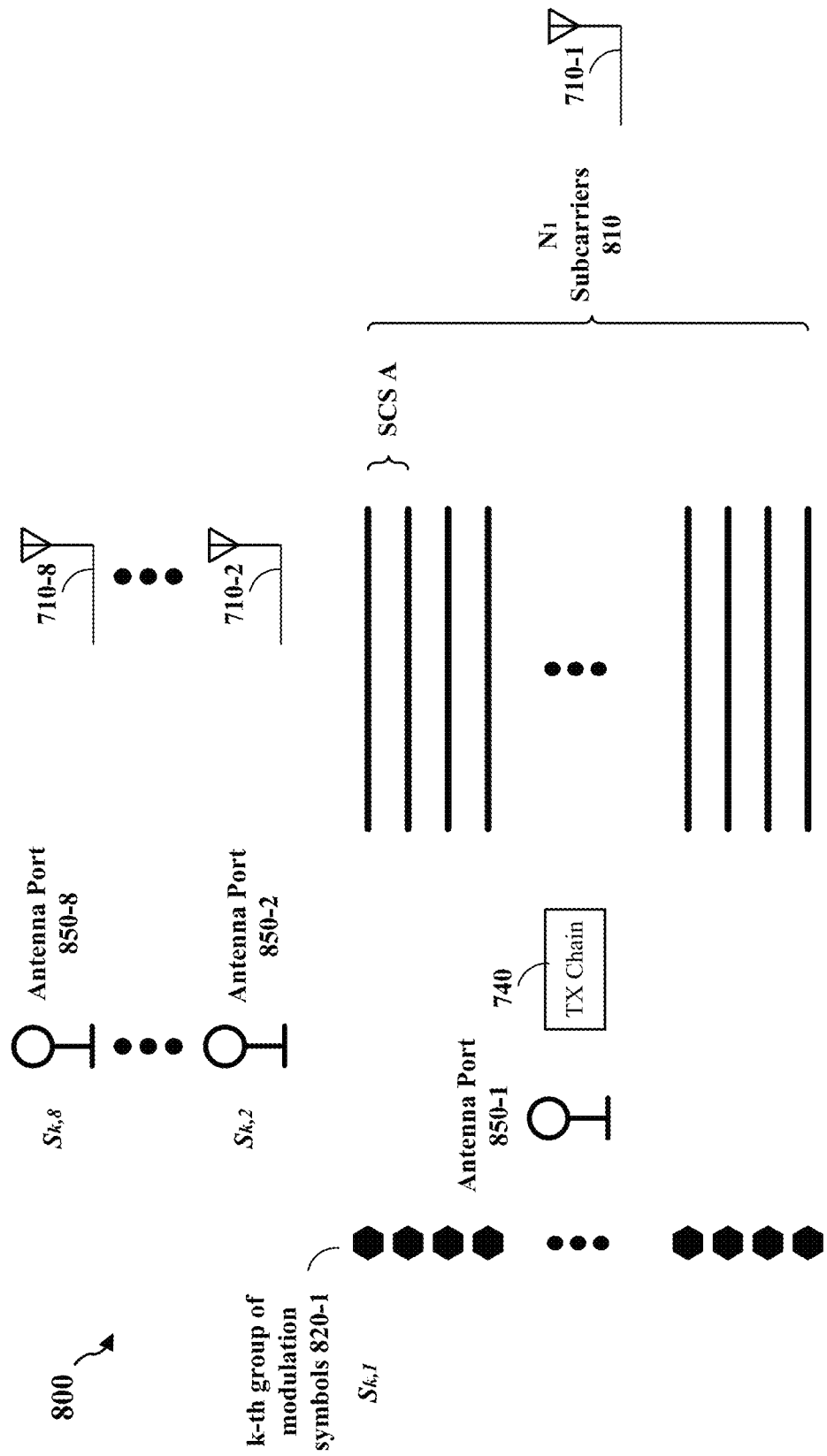
FIG. 8 is a diagram illustrating RF signal generation at a base station.

FIG. 8 is a diagram 800 illustrating RF signal generation at a base station. In this example, the base station 702 may be configured with 8 antenna ports 850-1 to 850-8 to each of which one or more of the antennas 710-1, 710-2, . . . 710-8 are assigned. In particular, each of the antenna ports 850-1 to 850-8 may be associated with more than one physical antenna. In such a case, each of the antenna port may be referred to as a beamformed antenna port.

Further, each transmission chain 740 may use $N_1$ subcarriers 810 (e.g., 1024 or 4096 subcarriers) having a $SCS_1$ (e.g., 30 KHz). The transmission chain 740 of the antenna 710-$i$ receives, from an $i^{th}$ antenna port, a $k^{th}$ group of $N_1$ modulation symbols 820-$i$, denoted as ski, and generates corresponding RF signals to be transmitted through the antenna 710-$i$ in an OFDM symbol A, which corresponds to $SCS_1$. k is the group index of the modulation symbols and i is the index of the antenna port.

Using the antenna 710-1 as an example, that antenna is assigned to the antenna port 850-1. A $k^{th}$ group of $N_1$ modulation symbols 820-1 from the antenna port 850-1, $s_{k,1}$, are to be transmitted in one OFDM symbol A through the transmission chain 740. The base station 702 applies $s_{k,1}$ to the $N_1$ subcarriers 810 in a corresponding time period.

Referring back to FIG. 7, the $N_1$ subcarriers 810 carrying the $N_1$ modulation symbols 820-1 are sent to the IFFT component 741 with $N_1$ inputs. The $N_1$ time domain signals output from the IFFT component 741 are treated as a time sequence and sent to the parallel to serial component 742 to form a combined time domain signal. The CP insertion component 743 receives the combined time domain signal and adds a cyclic prefix, resulting a time domain signal spanning an OFDM symbol period. The cyclic prefix may eliminate inter-symbol interference between two adjacent OFDM symbols. The resulting time domain signal is in digital form, and processed through the conversion component 744 to achieve a desired sample rate. The converted time domain signal in digital form is sent to the digital-to-analog converter 745, which accordingly generates an analog time domain signal. Subsequently, the up converter 746 receives the analog time domain signal and mixes the analog time domain signal with a first carrier frequency ($f_1$) to generate a RF signal. The RF signal is transmitted through the antenna 710-1 of the base station 702. In particular, the first carrier frequency of the RF signals transmitted from the base station 702 may be in FR1.

Similarly, each of the antenna ports 850-2 to 850-8 receives respective modulation symbols. A transmission chain 740 assigned to an antenna port accordingly generates corresponding RF signals, which are transmitted through an antenna assigned to that antenna port. As such, in this example, $s_{k,1}$ to $s_{k,B}$ are transmitted through the antennas 710-1, 710-2, . . . 710-8.

Figure 9:
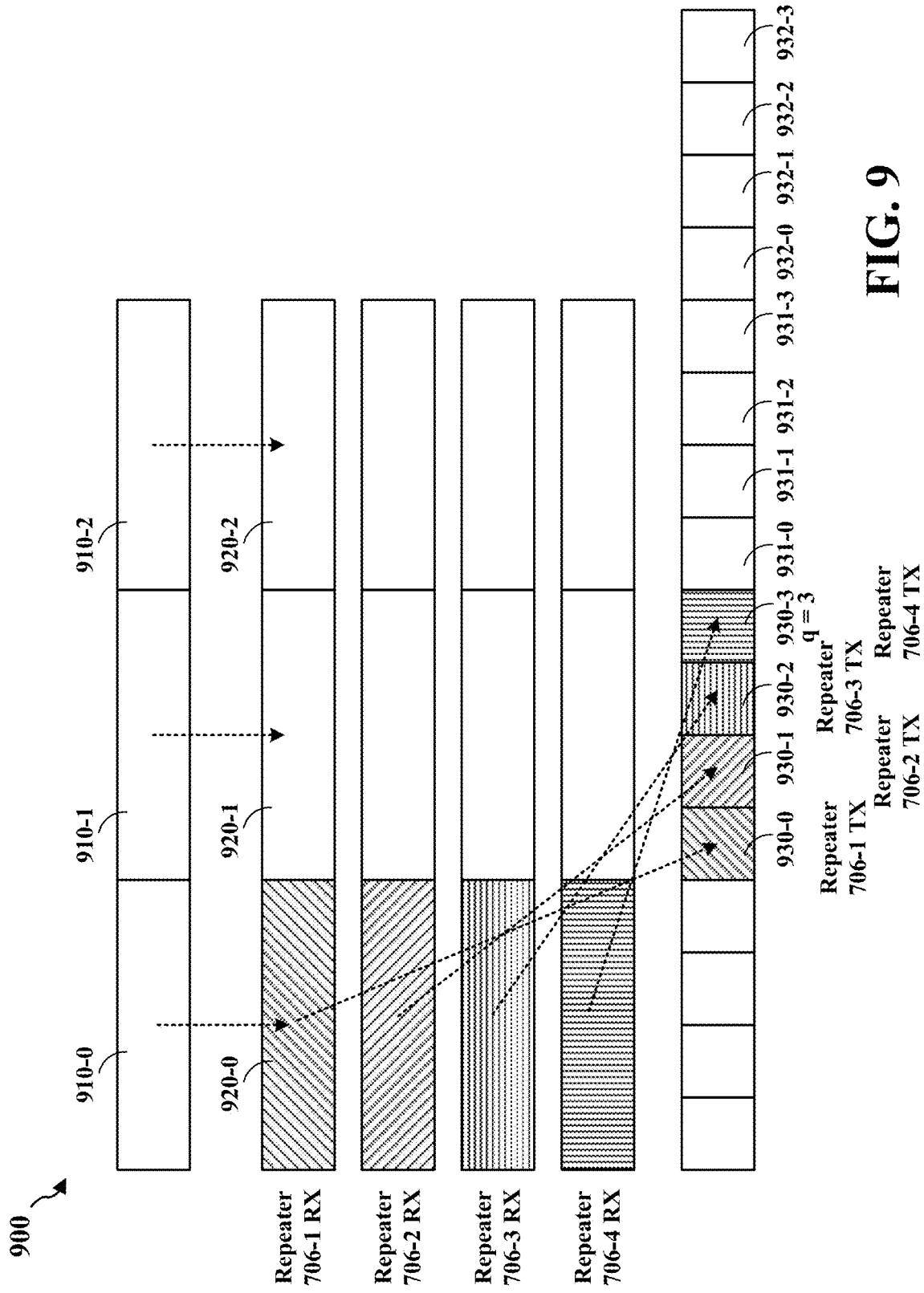
FIG. 9 is a diagram illustrating downlink transmission timing from a base station to a UE via one or more repeaters.

FIG. 9 is a diagram 900 illustrating downlink transmission timing from a base station to a UE via one or more repeaters. The base station 702 transmits, through the antennas 710-1, 710-2, . . . 710-8, RF signals on a first carrier frequency in slots 910-0, 910-1, 910-2, etc. As described infra, the slots 920-0, 920-1, 920-2, etc. are corresponding to a first subcarrier spacing ($SCS_1$). The repeaters 706-1 . . . 706-K receives the RF signals of the first carrier frequency in the slots 920-0, 920-1, 920-2, etc. The repeaters 706-1 . . . 706-K transform a first set of baseband signals carried on the RF signals of the first carrier frequency to obtain a second set of baseband signals, and transmit the second set of baseband signals over RF signals of a second carrier frequency in slots 930-0, . . . , 930-q, slots 931-0, . . . , 931-q, and slots 932-0, . . . , 932-q, etc. As described infra, the slots 930-0, . . . , 930-q etc. are corresponding to a second subcarrier spacing ($SCS_2$, e.g., 120 KHz). In NR, a slot may be an interval occupied by 14 OFDM symbols. In this example, q is 3.

The time duration of each of the slots 920-0, 920-1, 920-2, etc. is $TTI_1$. The time duration of each of the slots 931-0, . . . , 931-q, etc. is $TTI_2$. Denote $L=SCS_2/SCS_1=TTI_1/TTI_2$. Denote the first carrier frequency as $f_1$, and the second carrier frequency as $f_2$.

The repeaters 706-1 . . . 706-K receive the RF signals of $f_1$ from the base station 702 in $t_0 \times TTI_1$ (e.g., the slot 920-0). Each of the repeaters 706-1 . . . 706-K generates respective RF signals of $f_2$ as described supra. The $k^{th}$ repeater transmits its RF signals of $f_2$ in $(t_0+\text{offset}) \times TTI_1 + (k-1) \times TTI_2$ ($k=1, \ldots, K$) (e.g., the slots 930-0, . . . , 930-q). The offset (e.g., 1) is set to provide sufficient time for signal receiving and processing at a repeater.

The number of repeaters 706-1 . . . 706-K (i.e., K) is at most L to utilize the full timing resource for transmission. Accordingly, the UE 704 receives the RF signals at time $(t_0+\text{offset}) \times TTI_1 + (k-1) \times TTI_2$ ($k=1, \ldots, K$).

In this example, the repeaters 706-1 . . . 706-K receives RF signals in the slot 920-0. The repeater 706-1 transmits its RF signals in slot 930-0; the repeater 706-2 transmits its RF signals in slot 930-1; the repeater 706-3 transmits its RF signals in slot 930-2; and the repeater 706-4 transmits its RF signals in slot 930-3.

Referring back to FIG. 7, as described supra, there are K repeaters 706-1 . . . 706-K placed between the base station 702 and the UE 704. In general, a repeater has $M_r$ reception antennas and $M_t$ transmission antennas. In this example, for ease of presentation, $M_r=M$, $=M$. A single physical antenna may function as both a reception antenna and a transmission antenna. More specifically, M is 2. Each of the repeaters 706-1 . . . 706-K has reception antennas 722-1, 722-2 and transmission antennas 724-1, 724-2.

Each of the repeaters 706-1 . . . 706-K receives RF signals transmitted from the base station 702. For example, each of the reception antennas 722-1, 722-2 of the repeater 706-1 may receive RF signals transmitted from the antennas 710-1, 710-2, . . . 710-8 of the base station 702. A respective reception chain 750 processes RF signals received through each of the reception antennas 722-1, 722-2. The reception chain 750 includes a down converter 756, an analog-to-digital converter 755, a conversion component 754 that includes a rate converter and/or filter(s), a CP removal component 753, a serial to parallel component 752, an FFT component 751.

Using the reception antenna 722-1 as an example, the corresponding down converter 756 processes the RF signals received through that antenna to obtain corresponding analog baseband signals, for example, through frequency down-conversion. The analog-to-digital converter 755 converts the analog baseband signals to digital samples. In particular, to generate the channel signal samples from a baseband waveform, the baseband waveform may be sampled at a rate higher than its Nyquist sampling rate by the analog-to-digital converter 755.

The digital samples are then passed through the conversion component 754, which contains one or more digital filters. The digital filters may perform various functions including I-Q imbalance compensation, carrier synchronization, and/or timing synchronization, etc. to eliminate some imperfections in hardware.

Figure 10:
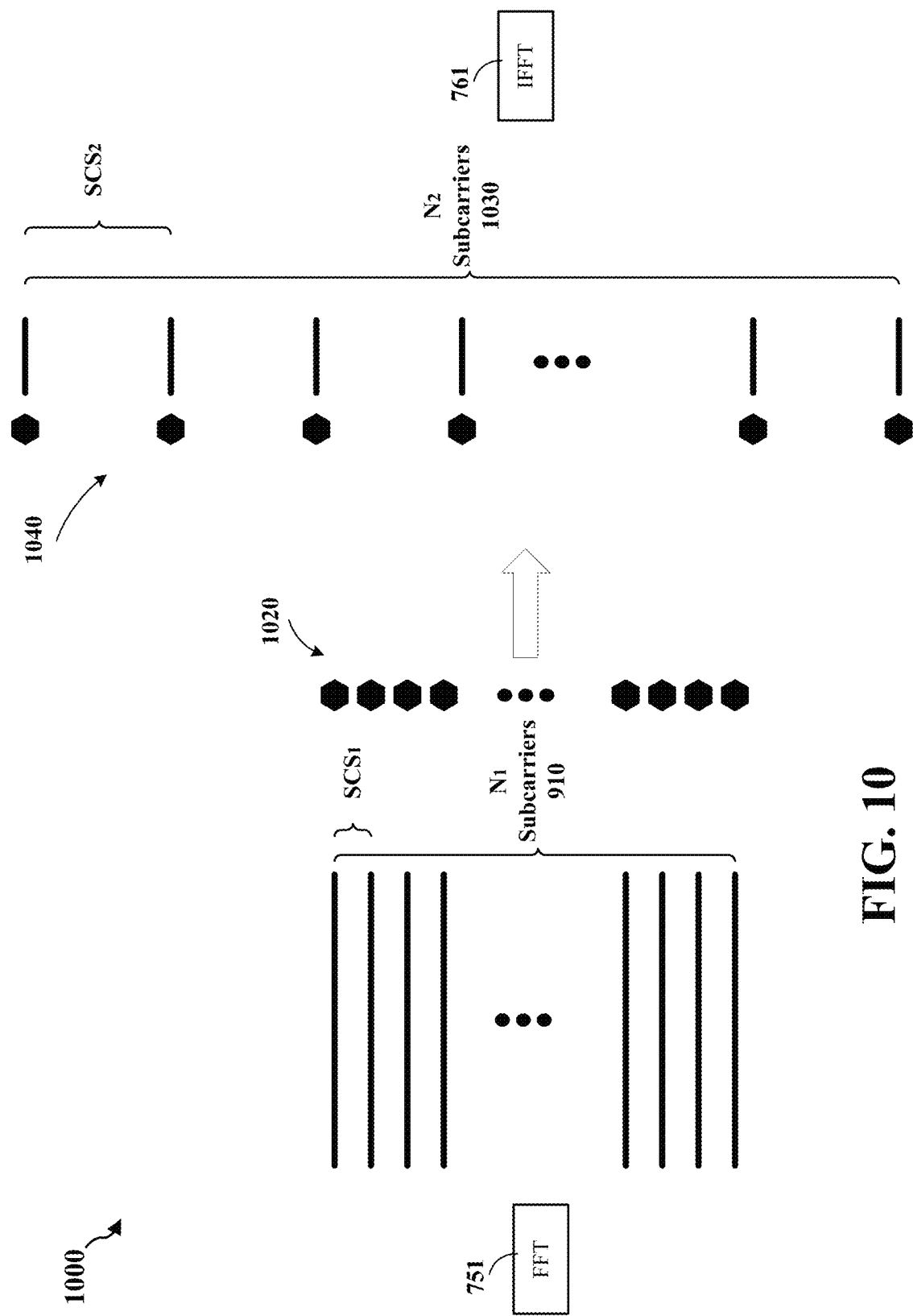
FIG. 10 is a diagram illustrating signal transformation at a repeater.

FIG. 10 is a diagram 1000 illustrating signal transformation at a repeater. Using the reception antenna 722-1 of the repeater 706-1 as an example, the FFT component 751 of the reception antenna 722-1 has a size $N_1$. The filtered digital samples from the conversion component 754 are passed through a down-sampling block, when necessary, to convert the data rate of the digital sample stream to match the FFT size $N_1$. Accordingly, the positions of the OFDM symbols can be determined in the down converted digital samples. Once digital samples within an OFDM symbol period are found, the CP removal component 753 removes the cyclic prefix (CP) used to prevent inter-symbol interference (ISI). The serial to parallel component 752 groups $N_1$ data samples as an input vector for the FFT component 751. The FFT component 751 outputs $N_1$ modulation symbols $\tilde{g}_{k,1}$ 1020, which are a combination of $s_{k,1}$ to $s_{k,8}$ as received at the reception antenna 722-1 of the repeater 706-1. Further, the $N_1$ modulation symbols $\tilde{g}_{k,1}$ 1020 are carried on $N_1$ subcarriers 810 with a $SCS_1$.

As described supra, each of the repeaters 706-1 . . . 706-K has transmission antennas 724-1, 724-2 and uses a respective transmission chain 760 to generate RF signals to be transmitted through each transmission antenna. Further, each transmission chain 760 corresponds to a respective reception chain 750. As described infra, modulation symbols received through a reception antenna of the repeater are retransmitted through a corresponding transmission antenna.

Using the repeater 706-1 as an example ($M_r=M_t=M=2$), the reception antennas 722-1, 722-2 correspond to the transmission antennas 724-1, 724-2. More specifically, $\tilde{g}_{k,1}$ 1020 received through the reception chain 750 of the reception antenna 722-1 are retransmitted through the transmission chain 760 of the transmission antenna 724-1. In a more general case with $M_r \neq M_t$, a mapping from the $M_r$ transmission antennas to the $M_t$ transmission antennas is needed and may be provided by a linear transformation matrix. In other words, the inputs for retransmitting through the transmission chain 760 of one of the repeater's transmission antennas is linearly combined from $\tilde{g}_{k,1}$ received in one or more of the repeater's $M_r$ reception antennas. If $M_r$ is equal to $M_t$, the linear transformation matrix can be simply an identity matrix representing one-to-one mapping between one reception antenna and one transmission antenna.

The transmission chain 760 uses $N_2$ subcarriers 1030 having a $SCS_2$. The IFFT component 761 uses $N_2$ points and has $N_2$ inputs/outputs. In one example, $N_2 \geq N_1$. The repeater 706-1 is configured with a predetermined rule that maps the $N_1$ outputs of the FFT component 751 to the $N_2$ inputs of the IFFT component 761. In particular, each of the $N_2$ inputs may be a linear combination of the $N_1$ outputs of the FFT component 751. In one example, the $N_1$ modulation symbols of $\tilde{g}_{k,1}$ are input through selected $N_1$ inputs of the $N_2$ inputs of the IFFT component 761. The remaining $(N_2-N_1)$ inputs of the IFFT component 761 may receive a predetermined value (e.g., 0). The inputs to the IFFT component 761 are $N_2$ modulation symbols $m_{k,1}$ 1040. $m_{k,i}$ represents the $N_2$ inputs of the IFFT component 761 of the $i^{th}$ transmission antenna of a repeater, that are derived from the $k^{th}$ group of modulation symbols transmitted from the base station 702.

More specifically, the repeater 706-1 applies a group of $N_2$ modulation symbols $m_{k,1}$ 1040 to the $N_2$ subcarriers 1030 in an OFDM symbol B. The $N_2$ subcarriers 1030 carrying the $N_2$ modulation symbols $m_{k,1}$ 1040 are sent to the IFFT component 761 with $N_2$ inputs. The $N_2$ digital samples output from the IFFT component 761 are treated as a time sequence and sent to the parallel to serial component 762 to form a time domain signal. The CP insertion component 743 receives the time domain signal and adds a cyclic prefix, resulting a time domain signal spanning an OFDM symbol B, which corresponds to $SCS_2$. The resulting time domain signal is in digital form, and is processed through a conversion component 764 that includes a rate converter and/or filter(s) to achieve a desired sample rate. The converted time domain signal in digital form is sent to the digital-to-analog converter 765, which accordingly generates an analog time domain signal. Subsequently, the up converter 766 receives the analog time domain signal and mixes the analog time domain signal with a second carrier frequency ($f_2$) to generate a RF signal. The RF signal is transmitted through the transmission antenna 724-1 of the repeater 706-1. In particular, the second carrier frequency of the RF signals transmitted from the repeaters 706-1 . . . 706-K may be in FR2.

As such, the baseband signal waveform is generated by multiplying OFDM symbols with time-shifted continuous-time pulses. Rate converting and digital low-pass filtering for pulse shaping may be performed before that the digital-to-analog converter 765 generates the waveform. Once the digital-to-analog converter 765 converts the OFDM symbols to an analog waveform, the spectral images can be rejected by using a simple analog filter.

Referring back to FIG. 7, as described supra, the conversion component 754 servicing the reception antenna 722-1 of the repeater 706-1 produces digital samples of the received baseband time domain signal in an OFDM symbol A. The CP removal component 753 removes the CP in the OFDM symbol A and produces digital samples 774 that represent $N_1$ modulation symbols $\tilde{g}_{k,1}$ 1020. The digital samples 774 occupies a time period 776. The time period 776 and a corresponding CP duration together constitute an OFDM symbol period A.

In a first technique, when $N_1=N_2$, after obtaining the digital samples 774, the repeater 706-1 may transform the digital samples 774 to generate digital samples 784, and input the digital samples 784 directly into the CP insertion component 763 of the corresponding transmission antenna 724-1. The digital samples 784 represents $N_2$ modulation symbols $m_{k,1}$ 1040, which are the same as $N_1$ modulation symbols $\tilde{g}_{k,1}$ 1020 in this example. The digital samples 774, which occupy the time period 776, are compressed into a time period 786. The CP insertion component 763 then adds a corresponding CP to the digital samples 784. The time period 786 and a corresponding CP duration together constitute an OFDM symbol period B. Subsequently, the transmission chain 760 of the transmission antenna 724-1 generates RF signals corresponding to the digital samples 784 as described supra.

In a second technique, using the it"reception antenna and the it" transmission antenna of the repeater 706-1 as an example, the serial to parallel component 752 of a corresponding reception chain 750 receives the digital samples 774 and generates a $N_1$-element input vector $g_{k,i}$ accordingly. The FFT component 751 receives the $g_{k,i}$ as inputs and produces $\tilde{g}_{k,i}$ as described supra according to: $\tilde{g}_{k,i} = FFT_{N_1}(g_{k,i})$, where $FFT_{N_1}(\cdot)$ denotes the $N_1$-point FFT function.

The repeater 706-1 can use one of the options described infra to construct $m_{k,i}$, which are the input vector of the IFFT component 761, based on $\tilde{g}_{k,i}$. In a first option, the $N_1$-element vector $\tilde{g}_{k,i}$ is mapped to the centered $N_1$ subcarriers of the $N_2$ subcarriers 1030, while the rest of the subcarriers are filled with zeros. This transformation can be represented as:

$$m_{k,i}=[0_{(N_2-N_1)/2}{}^T \tilde{g}_{k,i}{}^T 0_{(N_2-N_1)/2}]^T,$$

where $0_{(N_2-N_1)/2}$ is a zero vector of a size $(N_2-N_1)/2$.

In a second option, the repeater 706-1 maps the $j^{th}$ element of $\tilde{g}_{k,i}$ to the $n^{th}$ element of $m_{k,i}$, if $n=j \cdot R+\delta$, where R and $\delta$ are integers representing the distance and offset, respectively. The rest of the elements of $m_{k,i}$ with an index p, where $p \neq j \cdot R+\delta$ for all $j=1, \ldots, N_1$, are filled with zeros.

In a third option, an element of $\tilde{g}_{k,i}$ can be mapped/copied to multiple elements of $m_{k,i}$, where each element of $m_{k,i}$ corresponds to an element in $\tilde{g}_{k,i}$. Therefore, diversity gain can be achieved at the receiver since the information of a symbol in $\tilde{g}_{k,i}$ is carried by multiple subcarriers corresponding to the duplicate elements in $m_{k,i}$.

Referring back to FIG. 7, as described supra, there are K repeaters 706-1 . . . 706-K placed between the base station 702 and the UE 704. In general, the base station 702 has $N_T$ transmission antennas and corresponding $N_T$ transmission antenna ports. In this example, $N_T$ is 8 (corresponding to the antenna ports 850-1 to 850-8).

As described supra, there are total K repeaters 706-1 . . . 706-K placed in between the base station 702 and the UE 704. Each repeater has M reception antennas/transmission antennas. The base station 702 transmits baseband signals with $SCS_1$ carried on the first carrier frequency at the $N_T$ transmission antennas. The baseband signals correspond to R spatial layers, where R is a positive integer and can be at most equal to the total number of antennas of the repeaters, i.e., K*M. The repeaters 706-1 . . . 706-K receive a first set of baseband signals having $N_1$ subcarriers of $SCS_1$ transmitted by the base station 702, and then transform the first set of baseband signals to a second set of baseband signals having $N_2$ subcarriers of $SCS_2$. The repeaters 706-1 . . .

706-K transmit the second set of baseband signals to the UE 704 on the second carrier frequency.

Figure 11:
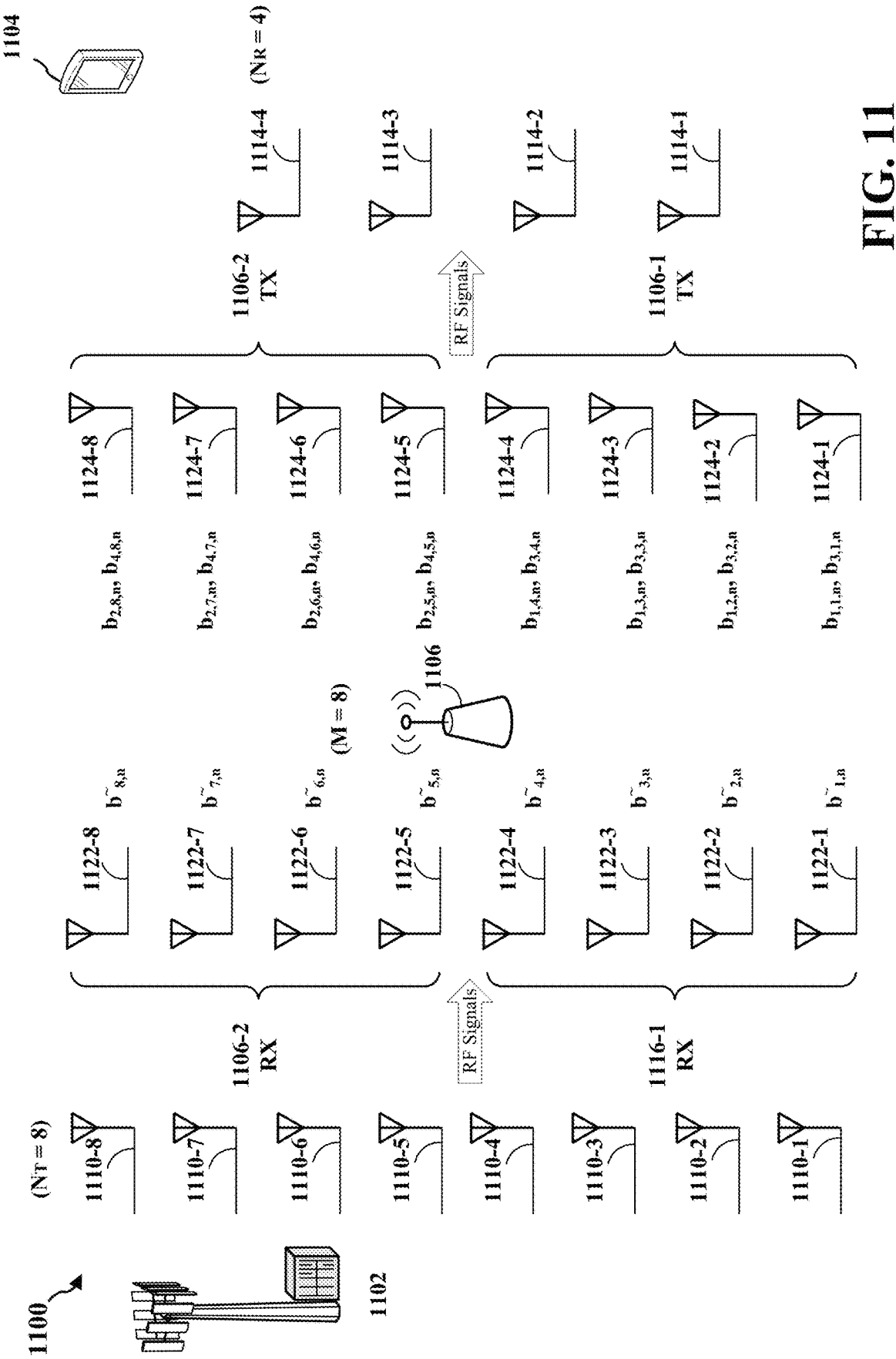
FIG. 11 is a diagram illustrating downlink MIMO transmission from a base station to a UE via one repeater.

FIG. 11 is a diagram 1100 illustrating downlink MIMO transmission from a base station to a UE via one repeater. In this example, a base station 1102 has 8 antennas 1110-1, 1110-2, ... 1110-8, and a UE 1104 has 4 reception antennas 1114-1, 1114-2, 1114-3 and 1114-4. Further, a repeater 1106 is placed between the base station 1102 and the UE 1104. The repeater 1106 has 8 reception antennas 1122-1, 1122-2, ..., 1122-8 and 8 transmission antennas 1124-1, 1124-2, ..., 1124-8. In certain configurations, the same antenna may function as a reception antenna and a transmission antenna.

Figure 12:
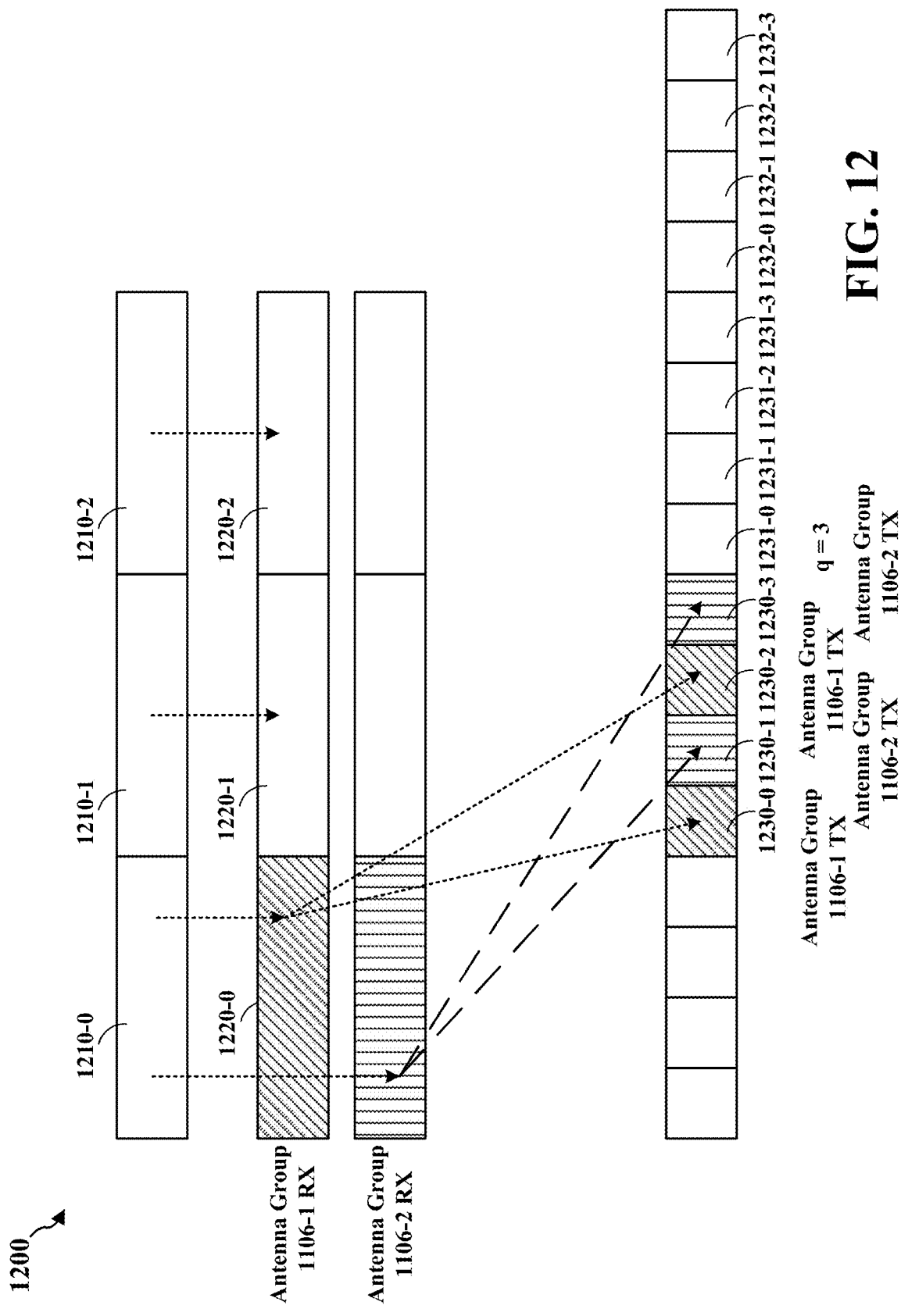
FIG. 12 is a diagram illustrating downlink transmission timing from a base station to a UE via one repeater.

FIG. 12 is a diagram 1200 illustrating downlink transmission timing from a base station to a UE via one repeater. The base station 1102 transmits, through the antennas 1110-1, 1110-2, ... 1110-8, RF signals on a first carrier frequency in slots 1210-0, 1210-1, 1210-2, etc. As described infra, the slots 1210-0, 1210-1, 1210-2, etc. are corresponding to a first subcarrier spacing ($SCS_1$, e.g., 30 kHz). The repeater 1106 receives the RF signals of the first carrier frequency in the slots 1220-0, 1220-1, 1220-2, etc. The repeater 1106 transforms a first set of baseband signals carried on the RF signals of the first carrier frequency to obtain a second set of baseband signals, and transmit the second set of baseband signals over RF signals of a second carrier frequency in slots 1230-0, ... 1230-q, slots 1231-0, ... 1231-q, and slots 1232-0, ... 1232-q, etc. As described infra, the slots 1230-0, ... 1230-q etc. are corresponding to a second subcarrier spacing ($SCS_2$, e.g., 120 kHz). In this example, q is 3.

The time duration of each of the slots 1220-0, 1220-1, 1220-2, etc. is $TTI_1$. The time duration of each of the slots 1230-0, ... 1230-q, etc. is $TTI_2$. Denote $L=SCS_2/SCS_1=TTI_1/TTI_2$. Denote the first carrier frequency as $f_1$, and the second carrier frequency as $f_2$. Each $TTI_1$ interval in $f_1$ corresponds to L $TTI_2$ intervals in $f_2$.

In this example, the repeater 1106 has 8 transmission antennas, and the UE 1104 has 4 reception antennas. In one configuration, at most 4 transmission antennas of the repeater 1106 transmit RF signals in one $TTI_2$ interval. Accordingly, the transmission antennas of the repeater 1106 are divided into groups of 4 antennas. More specifically, the transmission antennas 1124-1, 1124-2, 1124-3, and 1124-4 are mapped into the antenna group 1116-1 TX, and the transmission antennas 1124-5, 1124-6, 1124-7, and 1124-8 are mapped into the antenna group 1116-2 TX.

In this example, the reception antennas 1122-1 to 1122-8 of the repeater 1106 receive RF signals transmitted from the base station 702 in the slot 1220-0. The $N_1$ modulation symbols $g_{k,i}$ 1020 obtained through the i-th reception antenna of the repeater 1106 are mapped to the $N_2$ modulation symbols $m_{k,i}$ 1040 to be transmitted through the i-th transmission antenna of the repeater 1106.

During a first $TTI_2$ interval (e.g., the slot 1230-0), the antenna group 1116-1 TX are used by the repeater 1106 to transmit to the UE 704 the mapped $N_2$ modulation symbols $m_{k,i}$ 1040 corresponding to the $N_2$ modulation symbols $\tilde{g}_{k,i}$ (i=1, 2, 3, 4), while the antenna group 1116-2 TX remains idle. In the next $TTI_2$ interval (e.g., the slot 1230-1), the antenna group 1116-2 TX are used by the repeater 1106 to transmit the mapped $N_2$ modulation symbols $m_{k,i}$ 1040 corresponding to the $N_2$ modulation symbols $\tilde{g}_{k,i}$ (i=5, 6, 7, 8), while the antenna group 1116-1 TX remains idle. This alternating process continues for subsequent $TTI_2$ intervals, allowing the repeater 1106 to efficiently transmit the signals received from the base station 702 to the UE 704.

More specifically, as the slot 1220-0 correspond to the slots 1230-0 to 1230-3, the repeater 1106 may additionally utilize the slot 1230-2, using the antenna group 1116-1 TX to transmit the mapped $N_2$ modulation symbols $m_{k,i}$ 1040 corresponding to the $N_2$ modulation symbols $\tilde{g}_{k,i}$ (i=1, 2, 3, 4) for a second time, while the antenna group 1116-2 TX remains idle. Similarly, during the slot 1230-3, the antenna group 1116-2 TX can be used by the repeater 1106 to transmit the mapped $N_2$ modulation symbols $m_{k,i}$ 1040 corresponding to the $N_2$ modulation symbols $\tilde{g}_{k,i}$ (i=5, 6, 7, 8) for a second time, while the antenna group 1116-1 TX remains idle. This additional transmission of the mapped modulation symbols can help improve the reliability of the communication between the base station 702 and the UE 704, particularly in scenarios where the wireless channel conditions are challenging.

In this manner, the repeater 1106 can efficiently utilize its transmission antennas by grouping them and allocating different $TTI_2$ intervals for each group. This approach not only ensures that the UE 704 can receive the signals transmitted by the repeater 1106 using its limited number of reception antennas, but also allows for the possibility of multiple transmissions of the same signal within the corresponding $TTI_1$ interval, thereby enhancing the overall communication performance.

It should be noted that the described approach can be adapted to various configurations of the number of transmission antennas at the repeater, the number of reception antennas at the UE, and the relationship between the $TTI_1$ and $TTI_2$ intervals. The allocation of $TTI_2$ intervals and the grouping of transmission antennas can be adjusted accordingly to optimize the performance of the wireless communication system.

In general, a UE (e.g., the UE 704) has $N_R$ reception antennas. A repeater (e.g., the repeater 1106) has $M_T$ transmission antennas and $M_R$ reception antennas. In a simplified case, $M_T=M_R=M$ and $M>N_R$. Furthermore, the i-th reception antenna of the repeater is paired with the i-th transmission antenna of the repeater so that the signals to be transmitted by the i-th transmission antenna are derived from the signals received at the i-th reception antenna. As each $TTI_1$ interval in $f_1$ corresponds to L $TTI_2$ intervals in $f_2$, each transmit antenna of the repeater could, but not necessarily, transmit signals in at most L $TTI_2$ intervals. Considering the number of reception antennas $N_R$ at the UE, at most $N_R$ transmission antennas of the repeater are allowed to transmit in one $TTI_2$ interval. Therefore, in this approach, the L $TTI_2$ intervals can be allocated to at most $LN_R$ antennas of the repeater. If the number of antennas of the repeater M is less than $LN_R$, each transmission antenna can repeat its signal for at most $$\left\lceil \frac{LN_R}{M} \right\rceil TTI_2$$

intervals. The strategy for allocating the L TTIs in $f_2$ to the transmission antennas of the repeater is demonstrated below.

The repeater receives, from the base station, RF signals on $f_1$ at the reception antennas in a $TTI_1$ interval $T_a$ starting from $t_0 \times TTI_1$. $t_0$ is an integer. Each transmission antenna can transmit the corresponding RF output signal on $f_2$ in a $TTI_2$ interval $T_b$ starting from the time period $(t_0+\text{offset}) \times TTI_1 + (l-1) \times TTI_2$ for at least one l selected from $L=\{1, 2, \ldots, L\}$, where the offset, a positive integer, is set to provide sufficient time for signal receiving and processing. Denote the frequency domain baseband signal (i.e., modulation symbol)

received on the n-th subcarrier and at the i-th reception antenna in the time period $T_a$ as $\tilde{b}_{i,n}$, where i=1, ..., M. As described above, at most $N_R$ transmission antennas of the repeater are allowed to transmit in one $TTI_2$ interval. Therefore, the repeater only transmits baseband signal bin derived from $\tilde{b}_{i,n}$ in $TTI_2$ intervals whose index l∈L satisfies $$l = \left\lceil \frac{i}{N_R} \right\rceil + z \times \left\lceil \frac{M}{N_R} \right\rceil \text{ for } z = 0, 1, \ldots, \left\lceil \frac{LN_R}{M} \right\rceil - 1.$$

The i-th transmission antenna is assigned to the $$\left\lceil \frac{i}{N_R} \right\rceil\text{-th}$$

antenna group. The antennas in the same antenna group transmit the baseband signal in the same $TTI_2$ interval.

In other words, the baseband signal $b_{l,i,n}$ to be transmitted by the i-th transmission antenna in the l-th TTI can be expressed as $$b_{l,i,n} = \tilde{b}_{i,n} \times \delta_{l,i} = \begin{cases} \tilde{b}_{i,n}, & \text{if } l = \left\lceil \frac{i}{N_R} \right\rceil + z \times \left\lceil \frac{M}{N_R} \right\rceil \text{ for } z = 0, 1, \ldots, \left\lceil \frac{LN_R}{M} \right\rceil - 1 \\ 0, & \text{otherwise} \end{cases}$$

In this example, the repeater 1106 has 8 transmission antennas, and the UE 1104 has 4 reception antennas. In one configuration, at most 4 transmission antennas of the repeater 1106 transmit RF signals in one $TTI_2$ interval. Accordingly, the transmission antennas of the repeater 1106 are divided into groups of 4 antennas. More specifically, the transmission antennas 1124-1, 1124-2, 1124-3, and 1124-4 are mapped into the antenna group 1116-1 TX, and the transmission antennas 1124-5, 1124-6, 1124-7, and 1124-8 are mapped into the antenna group 1116-2 TX.

In the example illustrated in FIG. 11, there are M=8 transmission antennas, $N_R$=4 reception antennas, and L=4 $TTI_2$ intervals. As a result, the first four transmission antennas (i=1, ..., 4) transmit during the $TTI_2$ intervals with index l∈1, 3. The next four transmission antennas (i=5, ..., 8) transmit during the $TTI_2$ intervals with index l∈2,4.

More specifically, on the n-th subcarrier, the reception antennas 1122-1 through 1122-8 receive the baseband signals $\tilde{b}_{1,n}$ through $\tilde{b}_{8,n}$ on $f_1$ from the base station 1102 in a $TTI_1$ interval starting at $t_0 \times TTI_1$ (e.g., slot 1220-0), respectively.

The offset is set to provide sufficient time for signal receiving and processing at the repeater. In this example, the offset is 1. Accordingly, the transmission antennas in the antenna group 1116-1 TX transmit the baseband signals $b_{1,1,n}$ through $b_{1,4,n}$ of $f_2$ during the $TTI_2$ interval starting at $(t_0+1) \times TTI_1 + 0 \times TTI_2$ (e.g., the slot 1230-0), and the baseband signals $b_{3,1,n}$ through $b_{3,4,n}$ of $f_2$ during the $TTI_2$ interval starting at $(t_0+1) \times TTI_1 + 2 \times TTI_2$ (e.g., the slot 1230-2). Similarly, the transmission antennas in the antenna group 1116-2 TX transmit the baseband signals $b_{2,5,n}$ through $b_{2,8,n}$ of $f_2$ during the $TTI_2$ interval starting at $(t_0+1) \times TTI_1 + 1 \times TTI_2$ (e.g., the slot 1230-1), and the baseband signals $b_{4,5,n}$ through $b_{4,8,n}$ of $f_2$ during the $TTI_2$ interval starting at $(t_0+1) \times TTI_1 + 3 \times TTI_2$ (e.g., the slot 1230-3).

In this example, the baseband signals $b_{1,1,n}$ through $b_{1,4,n}$ as well as the baseband signals $b_{3,1,n}$ through $b_{3,4,n}$ are derived from the baseband signals $\tilde{b}_{1,n}$ through $\tilde{b}_{4,n}$. Similarly, the baseband signals $b_{2,5,n}$ through $b_{2,8,n}$ as well as the baseband signals $b_{4,5,n}$ through $b_{4,8,n}$ are derived from the baseband signals $\tilde{b}_{5,n}$ through $\tilde{b}_{8,n}$. These derived baseband signals are then transmitted by the corresponding transmission antennas of the repeater 1106 during their respective $TTI_2$ intervals.

For example, during the first $TTI_2$ interval (l=1), the transmission antennas 1124-1, 1124-2, 1124-3, and 1124-4 transmit the baseband signals $b_{1,1,n}$, $b_{1,2,n}$, $b_{1,3,n}$, and $b_{1,4,n}$, respectively. During the second $TTI_2$ interval (l=2), the transmission antennas 1124-5, 1124-6, 1124-7, and 1124-8 transmit the baseband signals $b_{2,5,n}$, $b_{2,6,n}$, $b_{2,7,n}$, and $b_{2,8,n}$, respectively. During the third $TTI_2$ interval (l=3), the transmission antennas 1124-1, 1124-2, 1124-3, and 1124-4 transmit the baseband signals $b_{3,1,n}$, $b_{3,2,n}$, $b_{3,3,n}$, and $b_{3,4,n}$, respectively. Finally, during the fourth $TTI_2$ interval (l=4), the transmission antennas 1124-5, 1124-6, 1124-7, and 1124-8 transmit the baseband signals $b_{4,5,n}$, $b_{4,6,n}$, $b_{4,7,n}$, and $b_{4,8,n}$, respectively.

The UE 1104 receives the RF signals transmitted by the repeater 1106 on $f_2$ at its reception antennas 1114-1 through 1114-4. The received RF signals carry superimposed baseband signals $b_{l,i,n}$ transmitted by the repeater's transmission antennas during the respective $TTI_2$ intervals.

The UE 1104 processes the received RF signals from the repeater 1106 during each $TTI_2$ interval. The UE 1104 first extracts the superimposed baseband signals $b_{l,i,n}$ (as received) from the received RF signals. Next, the UE 1104 combines the extracted baseband signals from different $TTI_2$ intervals to recover the original baseband signals that were transmitted by the base station 1102 on $f_1$.

In a second example, with M=8, $N_R$=2, and L=4, the transmission antennas are allocated as follows: the first two transmission antennas (i=1, 2) transmit during the TTI interval with index l∈1; the next two transmission antennas (i=3, 4) transmit during the TTI interval with index l∈2; the following two transmission antennas (i=5, 6) transmit during the TTI interval with index l∈3; and the last two transmission antennas (i=7, 8) transmit during the TTI interval with index l∈4.

On the n-th subcarrier, the reception antennas receive the baseband signals $\tilde{b}_{1,n}$ through $\tilde{b}_{8,n}$ of $f_1$ from the base station in a $TTI_1$ interval starting at $t_0 \times TTI_1$. The offset is set to provide sufficient time for signal receiving and processing at the repeater. In this example, the offset is 1. Accordingly, during the first $TTI_2$ interval (l=1), the transmission antennas 1 and 2 transmit the baseband signals $b_{1,1,n}$ and $b_{1,2,n}$, respectively. During the second $TTI_2$ interval (l=2), the transmission antennas 3 and 4 transmit the baseband signals $b_{2,3,n}$ and $b_{2,4,n}$, respectively. During the third $TTI_2$ interval (l=3), the transmission antennas 5 and 6 transmit the baseband signals $b_{3,5,n}$ and $b_{3,6,n}$, respectively. Finally, during the fourth $TTI_2$ interval (l=4), the transmission antennas 7 and 8 transmit the baseband signals $b_{4,7,n}$ and $b_{4,8,n}$, respectively.

The UE receives the RF signals transmitted by the repeater on $f_2$ at its reception antennas. The received RF signals carry superimposed baseband signals $b_{l,i,n}$ transmitted by the repeater's transmission antennas during the respective $TTI_2$ intervals.

The UE processes the received RF signals from the repeater during each $TTI_2$ interval. The UE first extracts the superimposed baseband signals $b_{l,i,n}$ (as received) from the received RF signals. Next, the UE combines the extracted baseband signals from different $TTI_2$ intervals to recover the original baseband signals that were transmitted by the base station on $f_1$.

Figure 13:
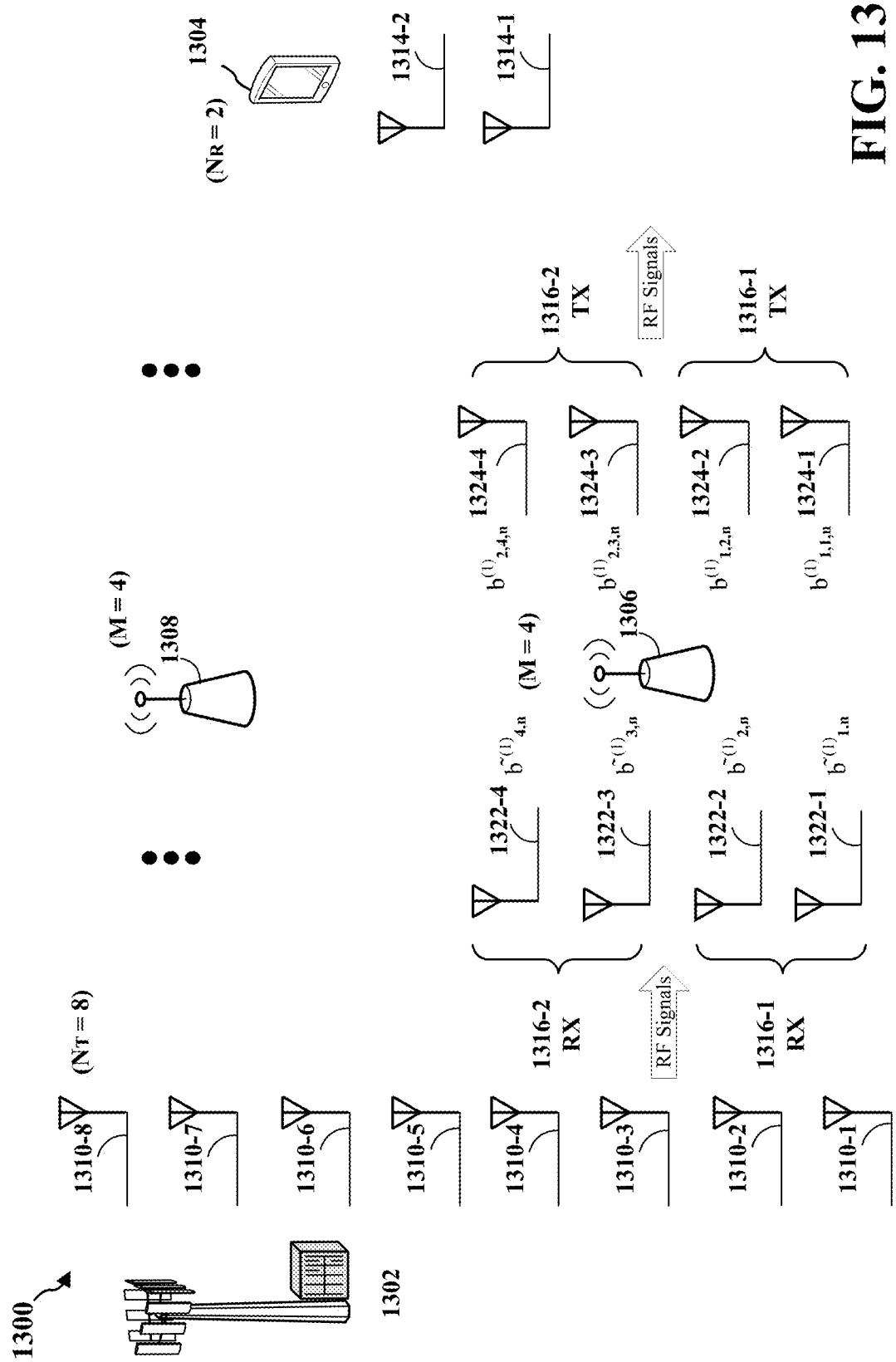
FIG. 13 is a diagram illustrating downlink MIMO transmission from a base station to a UE via more than one repeater.

FIG. 13 is a diagram 1300 illustrating downlink MIMO transmission from a base station to a UE via more than one repeater. In this example, a base station 1302 has eight antennas 1310-1, 1310-2, . . . , 1310-8, and a UE 1304 has two reception antennas 1314-1 and 1314-2. Additionally, two repeaters 1306 and 1308 are placed between the base station 1302 and the UE 1304. Each of the repeaters 1306 and 1308 has four reception antennas 1322-1, 1322-2, . . . , 1322-4 and four transmission antennas 1324-1, 1324-2, . . . , 1324-4. In certain configurations, the same antenna may function as both a reception and a transmission antenna.

Figure 14:
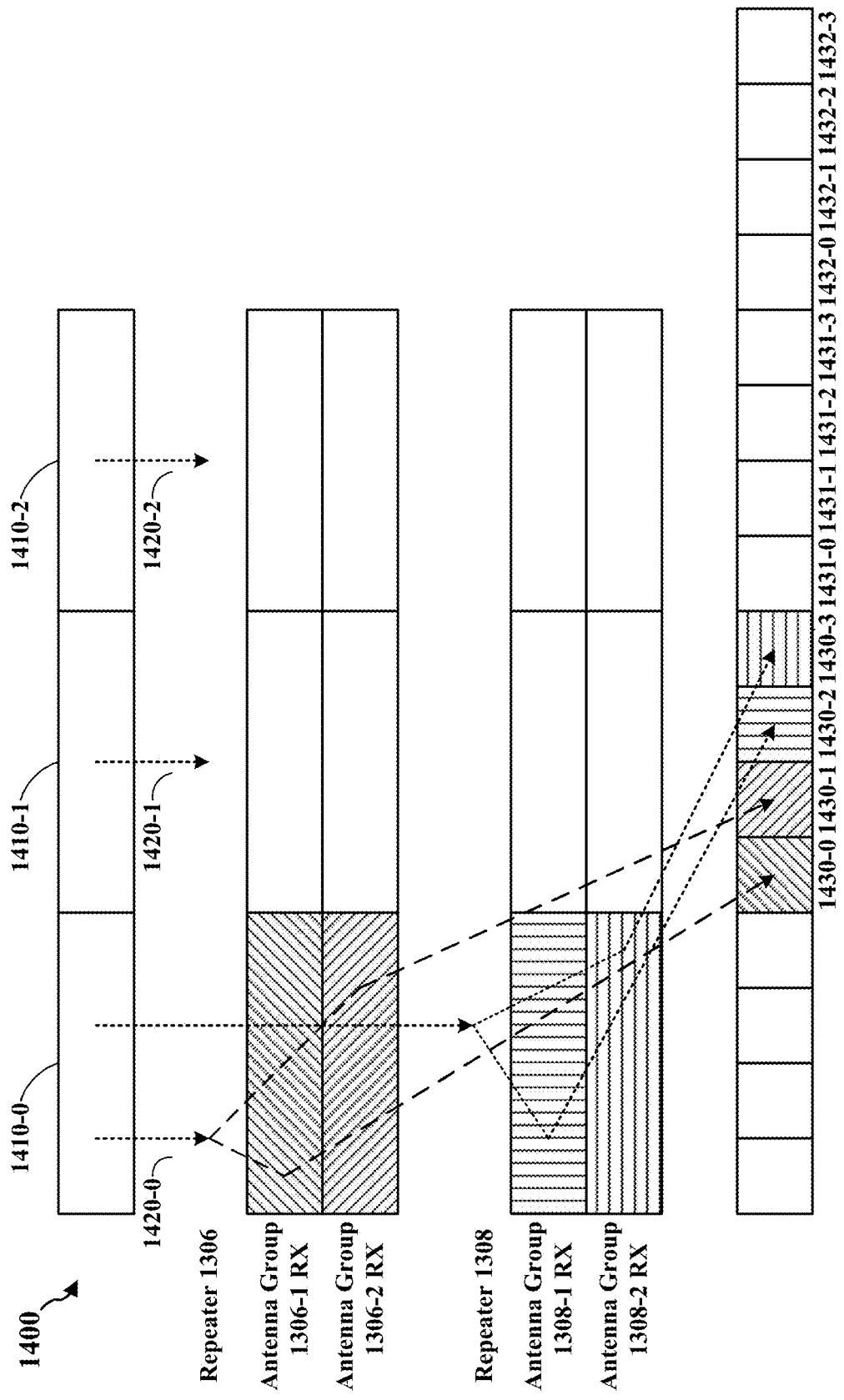
FIG. 14 is a diagram 1400 illustrating downlink transmission timing from a base station to a UE via more than one repeater.

FIG. 14 is a diagram 1400 illustrating downlink transmission timing from a base station to a UE via more than one repeater. The base station 1302 transmits RF signals on a first carrier frequency through antennas 1310-1, 1310-2, . . . , 1310-8 in slots 1410-0, 1410-1, 1410-2, etc. As described infra, the slots 1420-0, 1420-1, 1420-2, etc. correspond to a first subcarrier spacing ($SCS_1$, e.g., 30 kHz). The repeaters 1306 and 1308 receive the RF signals of the first carrier frequency in the slots 1420-0, 1420-1, 1420-2, etc. The repeaters 1306 and 1308 transform a first set of baseband signals carried on the RF signals of the first carrier frequency to obtain a second set of baseband signals, and transmit the second set of baseband signals over RF signals of a second carrier frequency in slots 1430-0, . . . , 1430-$q$, slots 1431-0, . . . , 1431-$q$, and slots 1432-0, . . . , 1432-$q$, etc. As described infra, the slots 1430-0, . . . , 1430-$q$, etc. correspond to a second subcarrier spacing ($SCS_2$, e.g., 120 kHz). In NR, a slot may be an interval occupied by 14 OFDM symbols. In this example, q is 3.

The time duration of each of the slots 1420-0, 1420-1, 1420-2, etc. is $TTI_1$. The time duration of each of the slots 1430-0, . . . , 1430-$q$, etc. is $TTI_2$. Denote $L=SCS_2/SCS_1=TTI_1/TTI_2$. Denote the first carrier frequency as $f_1$, and the second carrier frequency as $f_2$. Each $TTI_1$ interval in $f_1$ corresponds to L $TTI_2$ intervals in $f_2$.

In this example, there are two repeaters and L=4. The L $TTI_2$ intervals in $f_2$ that correspond to each $TTI_1$ interval in $f_1$ are divided into two groups. Each TTI group contains two $TTI_2$ intervals. The first TTI group (e.g., slots 1430-0 and 1430-1) is associated with the repeater 1306, and the second TTI group (e.g., slots 1430-2 and 1430-3) is associated with the repeater 1308.

More specifically, the first two transmission antennas of repeater 1306 (i=1, 2, e.g., antenna group 1316-1) transmit during the first $TTI_2$ interval (e.g., slot 1430-0) of the first TTI group. The next two transmission antennas of repeater 1306 (i=3, 4, e.g., antenna group 1316-2) transmit during the second $TTI_2$ interval (e.g., slot 1430-1) of the first TTI group. Similarly, the first two transmission antennas of repeater 1308 (i=1, 2) transmit during the third $TTI_2$ interval (e.g., slot 1430-2) of the second TTI group, and the next two transmission antennas of repeater 1308 (i=3, 4) transmit during the fourth $TTI_2$ interval (e.g., slot 1430-3) of the second TTI group.

Each repeater transmits RF signals in $TTI_2$ intervals of the associated TTI group according to the techniques applied to a single UE as described above with respect to FIG. 11. Specifically, the repeaters 1306 and 1308 receive the RF signals from the base station 1302 on the first carrier frequency $f_1$ and process the received signals to obtain the corresponding baseband signals. The repeaters then transform the baseband signals and transmit them on the second carrier frequency $f_2$ during the $TTI_2$ intervals of their respective TTI groups.

More specifically, on the n-th subcarrier, the reception antennas 1322-1 through 1322-4 of the repeater 1306 receive the baseband signals $\tilde{b}_{1,n}^{(1)}$ through $\tilde{b}_{4,n}^{(1)}$ on $f_1$ from the base station 1102 in a $TTI_1$ interval starting at $t_0 \times TTI_1$ (e.g., slot 1420-0), respectively. During the first $TTI_2$ interval starting at $(t_0+1) \times TTI_1 + 0 \times TTI_2$ (e.g., the slot 1430-0), the transmission antennas 1324-1, 1324-2 of the repeater 1306 transmit the baseband signals $b_{1,1,n}^{(1)}$, $b_{1,2,n}^{(1)}$, respectively.

In the second $TTI_2$ interval starting at $(t_0+1) \times TTI_1 + 1 \times TTI_2$ (e.g., the slot 1430-1), the transmission antennas 1324-3, 1324-4 of the repeater 1306 transmit the baseband signals $b_{2,3,n}^{(1)}$, $b_{2,4,n}^{(1)}$, respectively. Similarly, during the second $TTI_2$ interval starting at $(t_0+1) \times TTI_1 + 3 \times TTI_2$ (e.g., the slot 1430-3), the transmission antennas 1324-3, 1324-4 of the repeater 1308 transmit the baseband signals $b_{4,7,n}^{(1)}$, $b_{4,8,n}^{(1)}$, respectively.

Further, on the n-th subcarrier, the reception antennas 1322-1 through 1322-4 of the repeater 1308 receive the baseband signals $\tilde{b}_{1,n}^{(2)}$ through $\tilde{b}_{4,n}^{(2)}$ on $f_1$ from the base station 1102 in the $TTI_1$ interval starting at $t_0 \times TTI_h$ (e.g., slot 1420-0), respectively. In the third $TTI_2$ interval starting at $(t_0+1) \times TTI_1 + 2 \times TTI_2$ (e.g., the slot 1430-2), the transmission antennas 1324-1 and 1324-2 of the repeater 1308 transmit the baseband signals $b_{3,1,n}^{(2)}$ and $b_{3,2,n}^{(2)}$ generated at the repeater 1308, respectively.

In the fourth $TTI_2$ interval starting at $(t_0+1) \times TTI_1 + 3 \times TTI_2$ (e.g., the slot 1430-3), the transmission antennas 1324-3 and 1324-4 of the repeater 1308 transmit the baseband signals $b_{4,3,n}^{(2)}$ and $b_{4,4,n}^{(2)}$ generated at the repeater 1308, respectively.

The UE 1304 receives the RF signals transmitted by the repeaters 1306 and 1308 on $f_2$ at its reception antennas 1314-1 and 1314-2. The received RF signals carry superimposed baseband signals $b_{l,i,n}^{(1)}$ and $b_{l,i,n}^{(2)}$ transmitted by the repeater's transmission antennas during their respective $TTI_2$ intervals.

The UE 1304 processes the received RF signals from the repeaters 1306 and 1308 during respective $TTI_2$ intervals. The UE 1304 first extracts the superimposed baseband signals $b_{l,i,n}^{(1)}$ and $b_{l,i,n}^{(2)}$ (as received) from the received RF signals. Next, the UE 1304 combines the extracted baseband signals from different $TTI_2$ intervals and different repeaters to recover the original baseband signals that were transmitted by the base station 1302 on $f_1$.

For example, during the first $TTI_2$ interval (l=1), the UE 1304 receives the baseband signals $b_{1,1,n}^{(1)}$ and $b_{1,2,n}^{(1)}$ transmitted by the transmission antennas 1324-1 and 1324-2 of the repeater 1306. During the second $TTI_2$ interval (l=2), the UE 1304 receives the baseband signals $b_{2,3,n}^{(1)}$ and $b_{2,4,n}^{(1)}$ transmitted by the transmission antennas 1324-3 and 1324-4 of the repeater 1306. During the third $TTI_2$ interval (l=3), the UE 1304 receives the baseband signals $b_{3,1,n}^{(2)}$ and $b_{3,2,n}^{(2)}$ transmitted by the transmission antennas 1324-1 and 1324-2 of the repeater 1308. Finally, during the fourth $TTI_2$ interval (l=4), the UE 1304 receives the baseband signals $b_{4,3,n}^{(2)}$ and $b_{4,4,n}^{(2)}$ transmitted by the transmission antennas 1324-3 and 1324-4 of the repeater 1308. Upon receiving the baseband signals from the different $TTI_2$ intervals and different repeaters, the UE 1304 combines these signals to recover the original baseband signals transmitted by the base station 1302 on $f_1$.

Consider a more general case where the base station has $N_T$ transmission antennas, the UE has $N_R$ reception antennas, and there are K repeaters located between the base station and the UE. Each repeater has $M_R$ reception antennas and $M_T$ transmission antennas, where $M_R=M_T=M$. In general, for a downlink (DL) MIMO system assisted with K repeaters, the proposed architecture can transmit baseband signals carrying at most min{$N_T$, KM, $LN_R$} layers of data from the base station to the UE for every TTI in the first frequency, i.e., R≤min{$N_T$, KM, $LN_R$} while the UE is capable to recover the R layers of data with $N_R$ less than R. To share the L TTIs in the second frequency corresponding to one TTI in the first frequency among the K repeaters, the L TTIs in $f_2$ are partitioned into K groups, where each group $L_k$ contains $N_k$ TTIs in $f_2$ to be used by the k-th repeater. In each group $L_k$ containing $N_k$ TTIs in $f_2$, each k-th repeater (k=1, ..., K) can apply the case with only one repeater. The k-th repeater simply does not transmit during the TTIs not belonging to the k-th repeater.

For example, consider a base station with $N_T$=R=8, transmitting an 8-layer signal to a UE with $N_R$=2 via K repeaters with M=4 and L=4, where K=R/M=2. The TTIs in $f_2$ are partitioned into two groups, $\mathcal{L}_1$={1,2} and $\mathcal{L}_2$={3,4}. Furthermore, the first and second repeaters will only transmit at $\mathcal{L}_1$ and $\mathcal{L}_2$, respectively, and each repeater transmits signals according to the case with one repeater as described supra.

Note that the UE may need to perform receive (Rx) beam switching to receive signals from each repeater. In the design above, the UE needs to know how the base station maps data signals to the transmitting analog signals, and how repeaters map their Rx signals in the first frequency to the transmit (Tx) signals in the second frequency, so that the UE can recover the data signals from the received signals sent by the repeaters.

Figure 15:
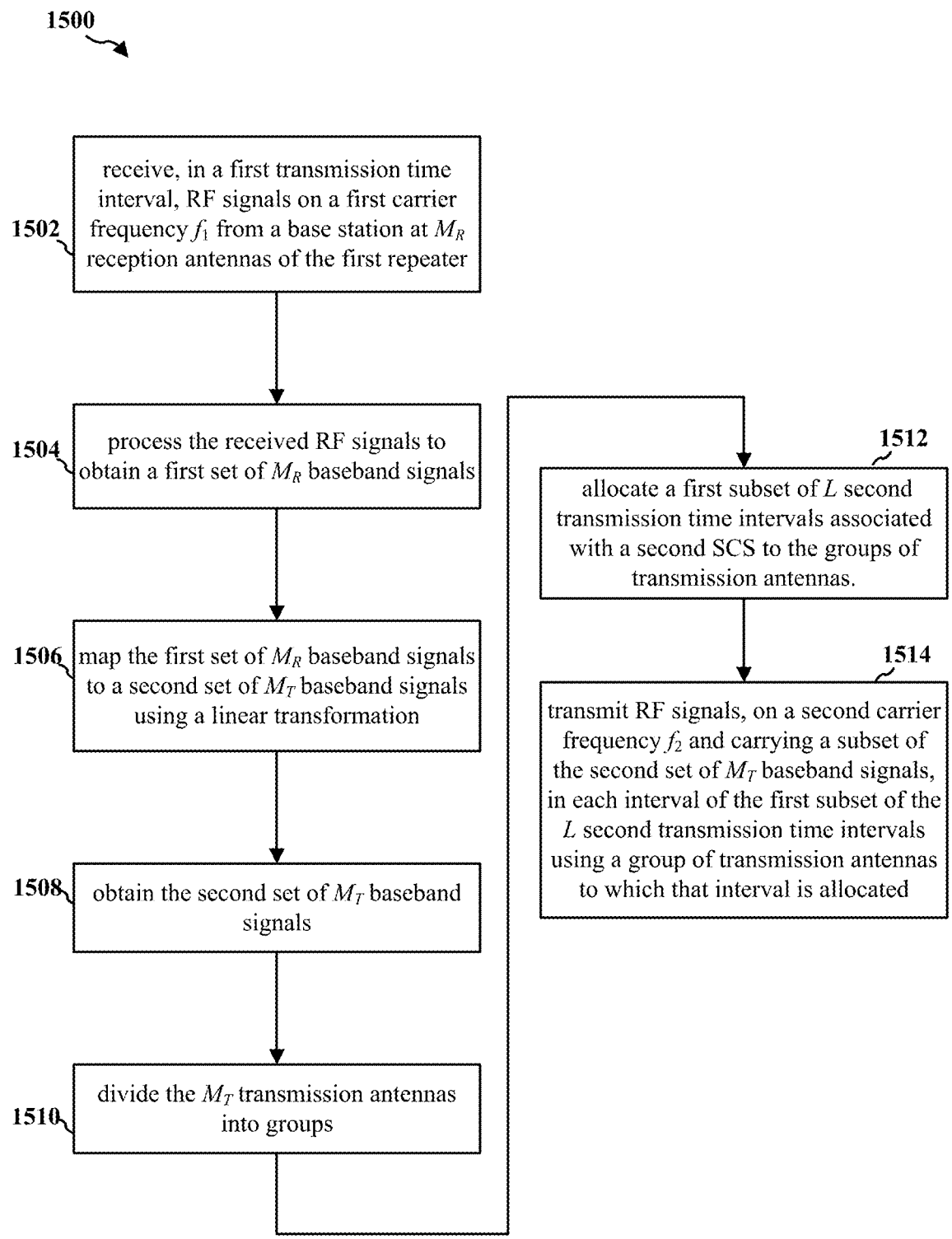
FIG. 15 is a flow chart of a method (process) for forwarding downlink data.

FIG. 15 is a flow chart 1500 of a method (process) for forwarding downlink data. The method may be performed by a repeater system including a first repeater (e.g., the repeater 1106 or the repeater 1306). In operation 1502, the first repeater receives, in the first transmission time interval, RF signals on a first carrier frequency $f_1$ from a base station at $M_R$ reception antennas of the first repeater. $M_R$ is a positive integer.

In operation 1504, the first repeater processes the received RF signals to obtain a first set of $M_R$ baseband signals. Each baseband signal of the first set corresponds to one of the $M_R$ reception antennas.

In operation 1506, the first repeater maps the first set of $M_R$ baseband signals to a second set of $M_T$ baseband signals using a linear transformation. For a given baseband signal of the first set, it represents $N_1$ modulation symbols on $N_1$ subcarriers using the first subcarrier spacing, and a mapped baseband signal of the second set, corresponding to the given baseband signal, represents $N_2$ modulation symbols on $N_2$ subcarriers using the second subcarrier spacing. The $N_2$ modulation symbols are derived from the $N_1$ modulation symbols.

In operation 1508, the first repeater obtains the second set of $M_T$ baseband signals. Each baseband signal in the second set corresponds to one of the $M_T$ transmission antennas of the first repeater, where $M_T$ is a positive integer.

In operation 1510, the first repeater divides the $M_T$ transmission antennas into groups. Each group contains a predetermined number of antennas not exceeding $N_R$, where $N_R$ is the number of reception antennas at a user equipment (UE) and is a positive integer.

In operation 1512, the first repeater allocates a first subset of L second transmission time intervals associated with a second subcarrier spacing (SCS) to the groups of transmission antennas. The L second transmission time intervals correspond to a first transmission time interval associated with a first SCS. The allocation of the L transmission time intervals to the groups of transmission antennas is based on a relationship between the first transmission time interval and the L second transmission time intervals, and the number of reception antennas at the UE.

In operation 1514, the first repeater transmits radio frequency (RF) signals, on a second carrier frequency $f_2$ and carrying a subset of the second set of $M_T$ baseband signals, in each interval of the first subset of the L second transmission time intervals using a group of transmission antennas to which that interval is allocated.

In certain configurations, the repeater system includes K repeaters, each having $M_T$ transmission antennas and $M_R$ reception antennas where K is a positive integer greater than 1. The K repeaters divide the L second transmission time intervals into K subsets. Each subset of the K subsets other than the first subset are allocated to a respective repeater of the K repeaters. A given repeater of the K repeaters other than the first repeater performs operations similar to those described in operations 1502-1514 for receiving, processing, mapping, obtaining, dividing, allocating, and transmitting RF signals.

The sequence of the operations detailed supra is provided as an example and should not be considered as restrictive. These operations may be reorganized based on different configurations.

Figure 16:
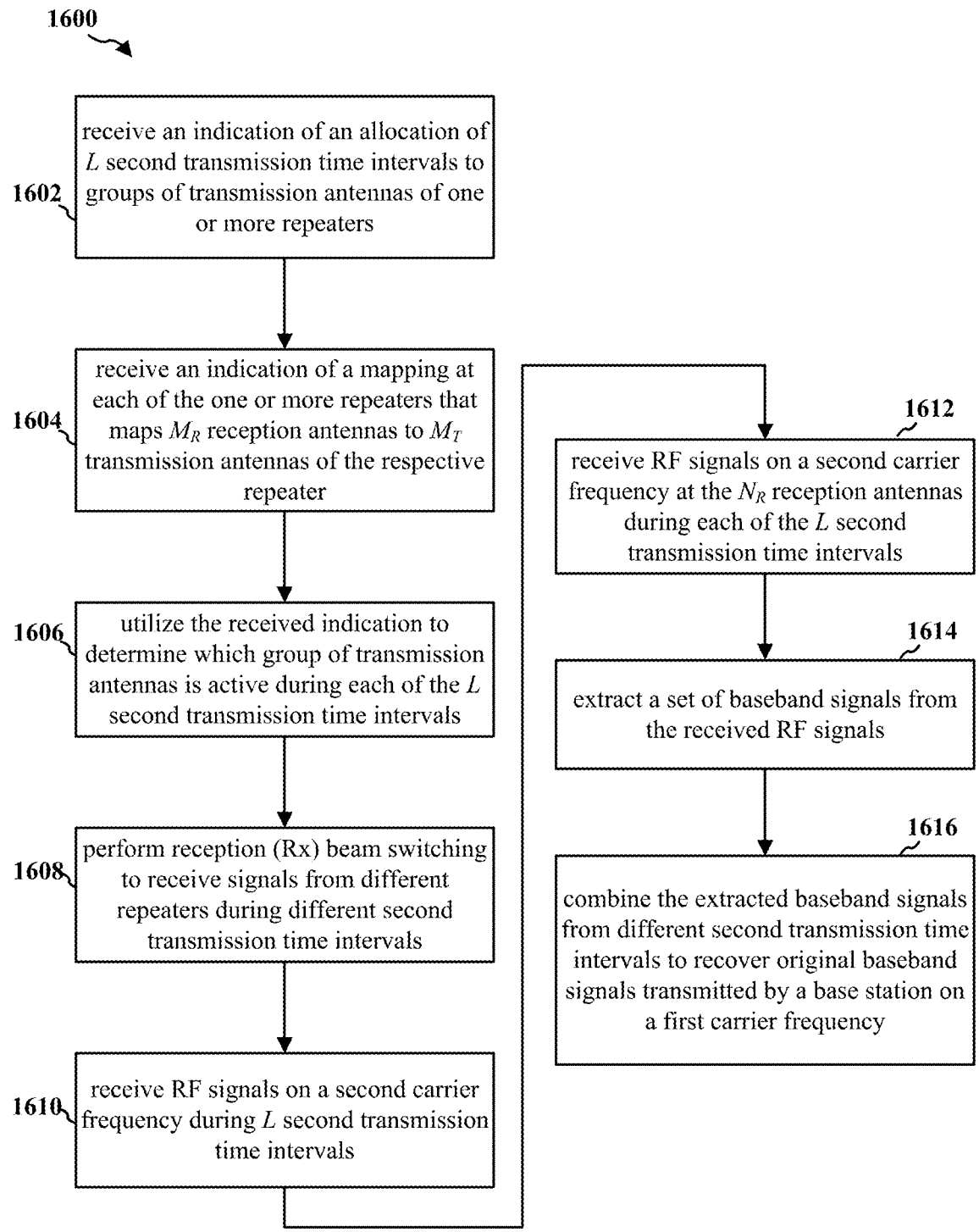
FIG. 16 is a flow chart of a method (process) for downlink data reception.

FIG. 16 is a flow chart 1600 of a method (process) for downlink data reception. The method may be performed by a UE (e.g., the UE 1104 or the UE 1304). The UE has $N_R$ reception antennas. In operation 1602, the UE receives an indication of an allocation of L second transmission time intervals to groups of transmission antennas of one or more repeaters each having $M_T$ transmission antennas and $M_R$ reception antennas. Each group contains a predetermined number of antennas not exceeding $N_R$. In operation 1604, the UE receives an indication of a mapping at each of the one or more repeaters that maps the $M_R$ reception antennas to the $M_T$ transmission antennas of the respective repeater.

In operation 1606, the UE utilizes the received indication to determine which group of transmission antennas is active during each of the L second transmission time intervals for processing the received RF signals and recovering the original baseband signals transmitted by the base station on the first carrier frequency. In operation 1608, the UE performs reception (Rx) beam switching to receive signals from different repeaters during different second transmission time intervals.

In operation 1610, the UE receives RF signals on a second carrier frequency, denoted as $f_2$, during L second transmission time intervals. The RF signals are transmitted by the one or more repeaters. In operation 1612, the UE receives the RF signals on the second carrier frequency at the $N_R$ reception antennas during each of the L second transmission time intervals.

In operation 1614, the UE extracts a set of baseband signals from the received RF signals. The set of baseband signals includes a subset of baseband signals transmitted by the one or more repeaters during each of the L second transmission time intervals. In operation 1616, the UE combines the extracted baseband signals from different second transmission time intervals to recover original baseband signals transmitted by a base station on a first carrier frequency, denoted as $f_1$. The original baseband signals transmitted by the base station on the first carrier frequency $f_1$ carry R spatial layers of data. R is a positive integer greater than $N_R$.

The sequence of the operations detailed supra is provided as an example and should not be considered as restrictive. These operations may be reorganized based on different configurations.

Figure 17:
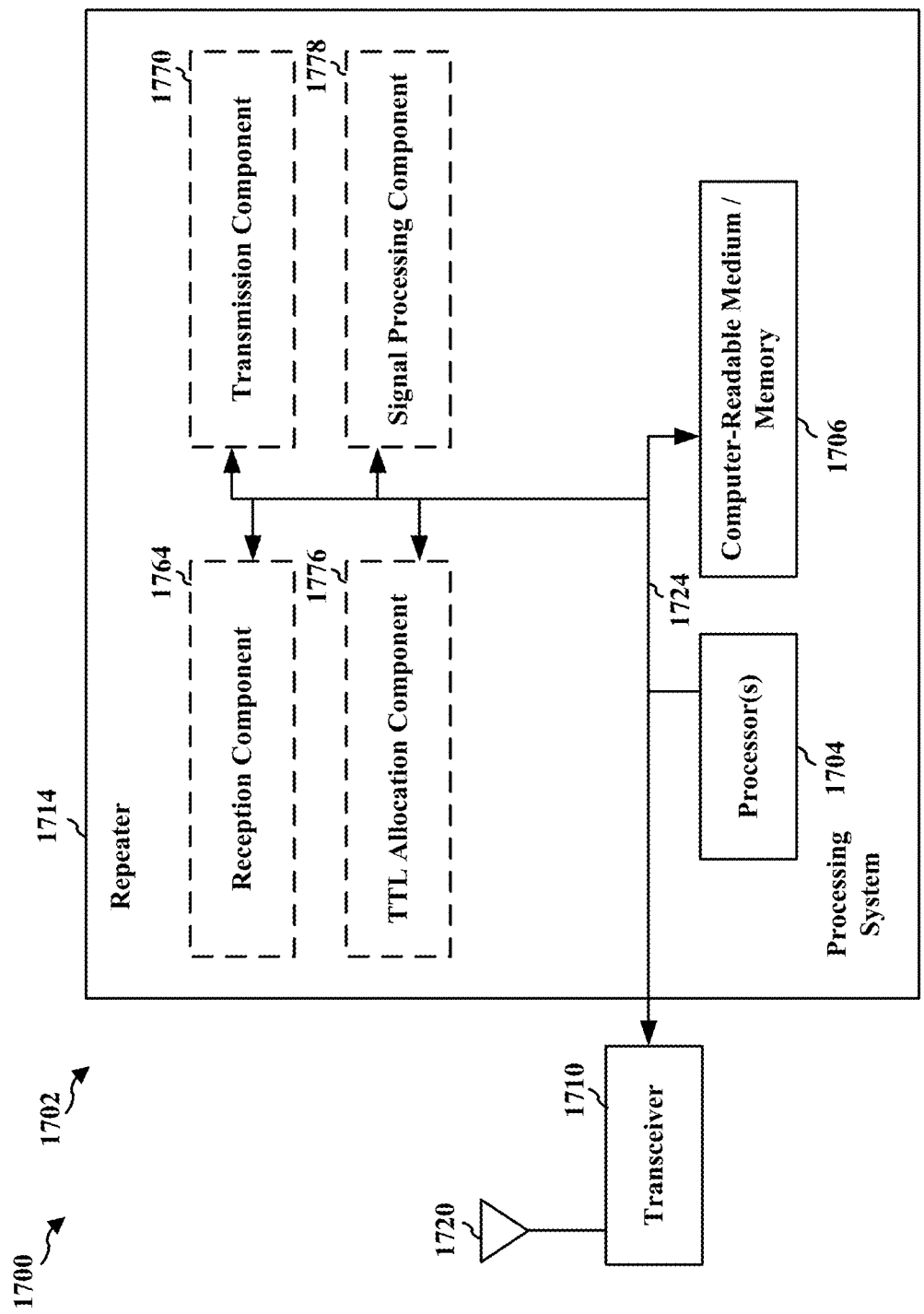
FIG. 17 is a diagram illustrating an example of a hardware implementation for an apparatus employing a processing system.

FIG. 17 is a diagram 1700 illustrating an example of a hardware implementation for an apparatus 1702 employing a processing system 1714. The apparatus 1702 may be a wireless device (e.g., the repeater 1106 or the repeater 1306). The processing system 1714 may be implemented with a bus architecture, represented generally by a bus 1724. The bus 1724 may include any number of interconnecting buses and bridges depending on the specific application of the processing system 1714 and the overall design constraints. The bus 1724 links together various circuits including one or more processors and/or hardware components, represented by one or more processors 1704, a reception component 1764, a transmission component 1770, a TTL allocation component 1776, a signal processing component 1778, and a computer-readable medium/memory 1706. The bus 1724 may also link various other circuits such as timing sources, peripherals, voltage regulators, and power management circuits, etc.

The processing system 1714 may be coupled to a transceiver 1710, which may be one or more of the transceivers 354. The transceiver 1710 is coupled to one or more antennas 1720, which may be the communication antennas 352.

The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1764. In addition, the transceiver 1710 receives information from the processing system 1714, specifically the transmission component 1770, and based on the received information, generates a signal to be applied to the one or more antennas 1720.

The processing system 1714 includes one or more processors 1704 coupled to a computer-readable medium/memory 1706. The one or more processors 1704 are responsible for general processing, including the execution of software stored on the computer-readable medium/memory 1706. The software, when executed by the one or more processors 1704, causes the processing system 1714 to perform the various functions described supra for any particular apparatus. The computer-readable medium/memory 1706 may also be used for storing data that is manipulated by the one or more processors 1704 when executing software. The processing system 1714 further includes at least one of the reception component 1764, the transmission component 1770, the TTL allocation component 1776, and the signal processing component 1778. The components may be software components running in the one or more processors 1704, resident/stored in the computer readable medium/memory 1706, one or more hardware components coupled to the one or more processors 1704, or some combination thereof. The processing system 1714 may be a component of the UE 350 and may include the memory 360 and/or at least one of the TX processor 368, the RX processor 356, and the communication processor 359.

In one configuration, the apparatus 1702 for wireless communication includes means for performing each of the operations of FIG. 15. The aforementioned means may be one or more of the aforementioned components of the apparatus 1702 and/or the processing system 1714 of the apparatus 1702 configured to perform the functions recited by the aforementioned means.

As described supra, the processing system 1714 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

Figure 18:
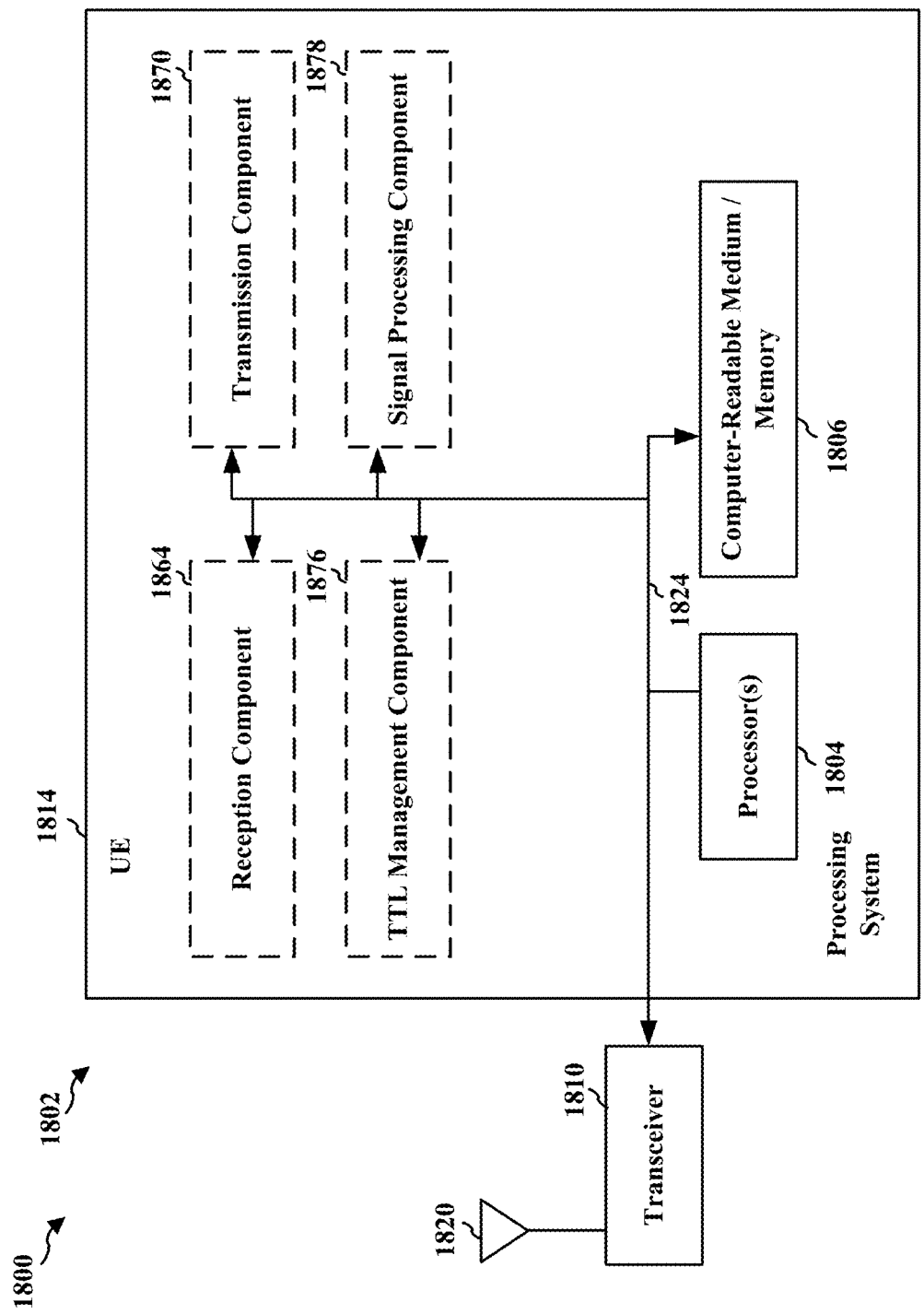
FIG. 18 is a diagram illustrating an example of a hardware implementation for an apparatus employing a processing system.

FIG. 18 is a diagram 1800 illustrating an example of a hardware implementation for an apparatus 1802 employing a processing system 1814. The apparatus 1802 may be a UE (e.g., the UE 1104 or the UE 1304). The processing system 1814 may be implemented with a bus architecture, represented generally by a bus 1824. The bus 1824 may include any number of interconnecting buses and bridges depending on the specific application of the processing system 1814 and the overall design constraints. The bus 1824 links together various circuits including one or more processors and/or hardware components, represented by one or more processors 1804, a reception component 1864, a transmission component 1870, a TTL management component 1876, a signal processing component 1878, and a computer-readable medium/memory 1806. The bus 1824 may also link various other circuits such as timing sources, peripherals, voltage regulators, and power management circuits, etc.

The processing system 1814 may be coupled to a transceiver 1810, which may be one or more of the transceivers 354. The transceiver 1810 is coupled to one or more antennas 1820, which may be the communication antennas 352.

The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1864. In addition, the transceiver 1810 receives information from the processing system 1814, specifically the transmission component 1870, and based on the received information, generates a signal to be applied to the one or more antennas 1820.

The processing system 1814 includes one or more processors 1804 coupled to a computer-readable medium/memory 1806. The one or more processors 1804 are responsible for general processing, including the execution of software stored on the computer-readable medium/memory 1806. The software, when executed by the one or more processors 1804, causes the processing system 1814 to perform the various functions described supra for any particular apparatus. The computer-readable medium/memory 1806 may also be used for storing data that is manipulated by the one or more processors 1804 when executing software. The processing system 1814 further includes at least one of the reception component 1864, the transmission component 1870, the TTL management component 1876, and the signal processing component 1878. The components may be software components running in the one or more processors 1804, resident/stored in the computer readable medium/memory 1806, one or more hardware components coupled to the one or more processors 1804, or some combination thereof. The processing system 1814 may be a component of the UE 350 and may include the memory 360 and/or at least one of the TX processor 368, the RX processor 356, and the communication processor 359.

In one configuration, the apparatus 1802/apparatus 1802' for wireless communication includes means for performing each of the operations of FIG. 16. The aforementioned means may be one or more of the aforementioned components of the apparatus 1802 and/or the processing system 1814 of the apparatus 1802 configured to perform the functions recited by the aforementioned means.

As described supra, the processing system 1814 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication in a repeater system including a first repeater, the first repeater being a wireless device, comprising:
   obtaining a second set of $M_T$ baseband signals, wherein each baseband signal in the second set corresponds to one of $M_T$ transmission antennas of the first repeater, and $M_T$ is a positive integer;
   dividing the $M_T$ transmission antennas into groups, wherein each group contains a predetermined number of antennas not exceeding $N_R$, and $N_R$ is the number of reception antennas at a user equipment (UE) and is a positive integer;
   allocating a first subset of L second transmission time intervals associated with a second subcarrier spacing (SCS) to the groups of transmission antennas, wherein the L second transmission time intervals correspond to a first transmission time interval associated with a first SCS; and
   transmitting radio frequency (RF) signals, on a second carrier frequency and carrying a subset of the second set of $M_T$ baseband signals, in each interval of the first subset of the L second transmission time intervals using a group of transmission antennas to which that interval is allocated.

2. The method of claim 1, further comprising:
   receiving, in the first transmission time interval, RF signals on a first carrier frequency from a base station at $M_R$ reception antennas of the first repeater, $M_R$ being a positive integer;
   processing the received RF signals to obtain a first set of $M_R$ baseband signals, wherein each baseband signal of the first set of $M_R$ baseband signals corresponds to one of the $M_R$ reception antennas;
   mapping the first set of $M_R$ baseband signals to the second set of $M_T$ baseband signals.

3. The method of claim 2, wherein the mapping is performed by a linear transformation.

4. The method of claim 2, wherein a given baseband signal of the first set of $M_R$ baseband signals represents $N_1$ modulation symbols on $N_1$ subcarriers using the first subcarrier spacing, wherein a mapped baseband signal of the second set of $M_T$ baseband signals, corresponding to the given baseband signal, represents $N_2$ modulation symbols on $N_2$ subcarriers using the second subcarrier spacing, wherein the $N_2$ modulation symbols are derived from the $N_1$ modulation symbols.

5. The method of claim 2, wherein each group of transmission antennas contains $N_R$ transmission antennas of the $M_T$ transmission antennas.

6. The method of claim 2, wherein the L second transmission time intervals are allocated to the groups of transmission antennas such that each group of transmission antennas transmits in at least one of the L transmission time intervals.

7. The method of claim 6, wherein the allocation of the L transmission time intervals to the groups of transmission antennas is based on a relationship between the first transmission time interval and the L second transmission time intervals, and the number of reception antennas at the UE.

8. The method of claim 1, wherein the repeater system comprises K repeaters including the first repeater, each having $M_T$ transmission antennas and $M_R$ reception antennas, K being a positive integer greater than 1, and the method further comprises:
   dividing the L second transmission time intervals into K subsets, wherein the K subsets include the first subset; and
   allocating each subset of the K subsets other than the first subset to a respective repeater of the K repeaters other than the first repeater.

9. The method of claim 8, further comprising, at a given repeater of the K repeaters other than the first repeater:

obtaining a second set of $M_T$ baseband signals, wherein each baseband signal in the second set corresponds to one of $M_T$ transmission antennas of the given repeater;

dividing the $M_T$ transmission antennas of the given repeater into groups, wherein each group contains a predetermined number of antennas not exceeding $N_R$;

allocating a respective subset of the L second transmission time intervals to the groups of transmission antennas of the given repeater; and transmitting RF signals, on the second carrier frequency and carrying a subset of the second set of $M_T$ baseband signals, in each interval of the respective subset of the L second transmission time intervals using a group of transmission antennas to which that interval is allocated.

10. The method of claim 9, further comprising, at the given repeater:

receiving, in the first transmission time interval, RF signals on a first carrier frequency from a base station at $M_R$ reception antennas of the given repeater;

processing the received RF signals to obtain a first set of $M_R$ baseband signals, wherein each baseband signal of the first set of $M_R$ baseband signals corresponds to one of the $M_R$ reception antennas at the given repeater; and mapping the first set of $M_R$ baseband signals to the second set of $M_T$ baseband signals.

11. A method for wireless communication of a user equipment (UE), comprising:

receiving radio frequency (RF) signals on a second carrier frequency during L second transmission time intervals, wherein the RF signals are transmitted by one or more repeaters, each having $M_T$ transmission antennas and $M_R$ reception antennas;

extracting a set of baseband signals from the received RF signals, wherein the set of baseband signals includes a subset of baseband signals transmitted by the one or more repeaters during each of the L second transmission time intervals; and combining the extracted baseband signals from different second transmission time intervals to recover original baseband signals transmitted by a base station on a first carrier frequency.

12. The method of claim 11, further comprising:

performing reception (Rx) beam switching to receive signals from different repeaters during different second transmission time intervals.

13. The method of claim 11, wherein the UE has $N_R$ reception antennas, and the method further comprises:

receiving the RF signals on the second carrier frequency at the $N_R$ reception antennas during each of the L second transmission time intervals.

14. The method of claim 13, wherein the original baseband signals transmitted by the base station on the first carrier frequency carries R spatial layers of data, R being a positive integer greater than $N_R$.

15. The method of claim 13, further comprising:

receiving, at the UE, an indication of an allocation of L second transmission time intervals to groups of transmission antennas of the one or more repeaters, wherein each group contains a predetermined number of antennas not exceeding $N_R$; and utilizing the received indication to determine which group of transmission antennas is active during each of the L second transmission time intervals for processing the received RF signals and recovering the original baseband signals transmitted by the base station on the first carrier frequency.

16. The method of claim 11, further comprising:

receiving, at the UE, an indication of a mapping at each of the one or more repeaters that maps the $M_R$ reception antennas to the $M_T$ transmission antennas of the respective repeater.

17. A repeater system for wireless communication, comprising:

a first repeater including
a memory; and
at least one processor coupled to the memory and configured to:

obtain a second set of $M_T$ baseband signals, wherein each baseband signal in the second set corresponds to one of $M_T$ transmission antennas of the first repeater, and $M_T$ is a positive integer;

divide the $M_T$ transmission antennas into groups, wherein each group contains a predetermined number of antennas not exceeding $N_R$, and $N_R$ is the number of reception antennas at a user equipment (UE) and is a positive integer;

allocate a first subset of L second transmission time intervals associated with a second subcarrier spacing (SCS) to the groups of transmission antennas, wherein the L second transmission time intervals correspond to a first transmission time interval associated with a first SCS; and transmit radio frequency (RF) signals, on a second carrier frequency and carrying a subset of the second set of $M_T$ baseband signals, in each interval of the first subset of the L second transmission time intervals using a group of transmission antennas to which that interval is allocated.

18. The repeater system of claim 17, wherein the at least one processor is further configured to:

receive, in the first transmission time interval, RF signals on a first carrier frequency from a base station at $M_R$ reception antennas of the first repeater, $M_R$ being a positive integer;

process the received RF signals to obtain a first set of $M_R$ baseband signals, wherein each baseband signal of the first set of $M_R$ baseband signals corresponds to one of the $M_R$ reception antennas;

map the first set of $M_R$ baseband signals to the second set of $M_T$ baseband signals.

19. The repeater system of claim 18, wherein the mapping is performed by a linear transformation.

20. The repeater system of claim 18, wherein a given baseband signal of the first set of $M_R$ baseband signals represents $N_1$ modulation symbols on $N_1$ subcarriers using the first subcarrier spacing, wherein a mapped baseband signal of the second set of $M_T$ baseband signals, corresponding to the given baseband signal, represents $N_2$ modulation symbols on $N_2$ subcarriers using the second subcarrier spacing, wherein the $N_2$ modulation symbols are derived from the $N_1$ modulation symbols.

* * * * *